US012553812B2

(12) United States Patent
Hirsch

(10) Patent No.: US 12,553,812 B2
(45) Date of Patent: Feb. 17, 2026

(54) VACUUM ULTRAVIOLET CRYO-EM GRID SCREENING TOOL

(71) Applicant: Gregory Hirsch, Pacifica, CA (US)

(72) Inventor: Gregory Hirsch, Pacifica, CA (US)

( * ) Notice: Subject to any disclaimer, the term of this patent is extended or adjusted under 35 U.S.C. 154(b) by 289 days.

(21) Appl. No.: 18/114,103

(22) Filed: Feb. 24, 2023

(65) Prior Publication Data

US 2024/0011885 A1 Jan. 11, 2024

Related U.S. Application Data

(63) Continuation-in-part of application No. 17/943,079, filed on Sep. 12, 2022, now abandoned.

(60) Provisional application No. 63/243,521, filed on Sep. 13, 2021.

(51) Int. Cl.
*G01N 15/06* (2024.01)
*G01N 15/075* (2024.01)

(52) U.S. Cl.
CPC ........... *G01N 15/06* (2013.01); *G01N 15/075* (2024.01)

(58) Field of Classification Search
None
See application file for complete search history.

(56) References Cited

U.S. PATENT DOCUMENTS

| 9,772,265 | B2 * | 9/2017 | Rémigy | H01J 37/20 |
| 9,786,469 | B2 * | 10/2017 | Wang | H01J 37/261 |
| 9,958,362 | B1 * | 5/2018 | Roper | G01N 1/312 |
| 10,921,268 | B1 * | 2/2021 | Hendriksen | G01N 23/225 |
| 2016/0351374 | A1 * | 12/2016 | Wang | C23F 1/40 |
| 2017/0254739 | A1 * | 9/2017 | Faez | G01N 15/1484 |
| 2020/0270070 | A1 * | 8/2020 | Kratochvíl | B65G 47/68 |
| 2021/0098226 | A1 * | 4/2021 | Closs | H01J 37/20 |

(Continued)

OTHER PUBLICATIONS

Engstrom, Tyler, et al., "High-resolution single-particle cryo-EM of samples vitrified in boiling nitrogen", IUCrJ, Cryo| EM, vol. 8, Aug. 3, 2021, pp. 867-877.

(Continued)

*Primary Examiner* — David J Makiya
*Assistant Examiner* — Soorena Kefayati
(74) *Attorney, Agent, or Firm* — Marek Alboszta

(57) ABSTRACT

A tool and method for screening cryogenic electron microscopy (cryo-EM) sample grids using vacuum ultraviolet (VUV) illumination in two configurations. First configuration directly images cryo-EM grids using bright-field optical microscopy employing VUV wavelengths and specialized VUV optics. Second configuration converts transmitted VUV radiation from the cryo-EM grid to visible or near-UV light with a scintillator positioned by the grid. The resultant luminescent high-resolution shadow image is viewed using more conventional microscope optics. In both configurations, individual micron-scale grid holes are imaged to determine ice thickness and quality from the optical absorption of ultrathin vitrified water layers with a precision of a few nanometers. Longer wavelengths can be used to independently view protein concentration and distribution within the ice layer. This tool greatly increases yield of high-quality grids before cryo-EM analysis and is compatible with Single Particle Analysis (SPA) and other cryo-EM methods including cryo-electron Tomography and microcrystal electron diffraction.

20 Claims, 10 Drawing Sheets

(56) References Cited

U.S. PATENT DOCUMENTS

| | | | | |
|---|---|---|---|---|
| 2022/0155193 A1* | 5/2022 | Dolezal | .................. | H01J 37/26 |
| 2022/0157559 A1* | 5/2022 | Van Putte | ............ | B01J 19/0046 |
| 2022/0291098 A1* | 9/2022 | Closs | ..................... | H01J 37/20 |
| 2023/0135352 A1* | 5/2023 | Mcmullan | ............ | H01J 37/153 |
| | | | | 250/311 |

OTHER PUBLICATIONS

Klebl, David P., et al., "Need for Speed: Examining Protein Behavior during CryoEM Grid Preparation at Different Timescales", Structure, vol. 28, Elsevier Ltd., Nov. 3, 2020, pp. 1238-1248.

Koning, Roman I., et al., "Automated vitrification of cryo-EM samples with controllable sample thickness using suction and real-time optical inspection", Nature Communications, 13:2985, 2022, 10 pgs.

Levitz, Talya S., et al., "Approaches to Using the Chameleon: Robust, Automated, Fast-Plunge cryoEM Specimen Preparation", Frontiers in Molecular Bioscience, vol. 9, Jun. 23, 2022, 10 pgs.

Ravelli, Raimond B. G., et al., "Cryo-EM structures from sub-nl volumes using pin-printing and jet vitrification", Nature Communications, 11:2563, 2020, 9 pgs.

Weissenberger, Giulia, et al., "Understanding the invisible hands of sample preparation for cryo-EM", Nature Methods, vol. 18, May 2021, pp. 463-471.

\* cited by examiner

VACUUM ULTRAVIOLET CRYO-EM GRID SCREENING TOOL

GOVERNMENT LICENSE RIGHTS

This invention was made in part with government support under Grant No. DE-5C0022376, entitled "Cryo-EM Grid Screening Tool" awarded by the Department of Energy (DOE), Office of Science, on 14 Feb. 2022.

This application is a Continuation-In-Part of U.S. patent application Ser. No. 17/943,079 filed on Sep. 12, 2022, which claims priority from U.S. Provisional Patent Application No. 63/243,521 filed on Sep. 13, 2021, both of which are herein incorporated by reference in their entirety.

FIELD OF THE INVENTION

This invention relates generally to providing a tool for screening cryogenic electron microscopy (cryo-EM) grids using an inspection light beam at vacuum ultraviolet (VUV) wavelengths to determine the state of ultrathin vitrified water layers and samples held in these layers prior to subsequent high-resolution analysis using cryogenic electron microscopy (cryo-EM).

BACKGROUND

The advent of cryogenic electron microscopy (cryo-EM) has been transformative in expanding scientific capabilities for the study and elucidation of biological ultrastructure. There are several versions of cryo-EM, all of which involve examination of frozen biological Samples at very low temperature. In practice, aqueous samples containing such biological structures to be examined are frozen very so rapidly so that the water content solidifies into an amorphous glass-like state-a process known as vitrification. This protects the samples from damage due to crystalline ice growth during the freezing process.

Several different versions of cryo-EM have been developed. (cryo-ET), These include cryo electron tomography cryo electron micro-diffraction (cryo-MicroED) and the most commonly employed form of cryogenic electron microscopy called single particle analysis (SPA). SPA permits direct determination of the structure of individual macromolecules and complexes in their native hydrated state, sometimes with atomic resolution. Such extraordinary performance without reliance on crystallization and other potential artifact- generating steps represents a revolutionary advance for structural biology and has led to an explosive growth in its use. Cryo-EM has sometimes been referred to as the "Resolution Revolution". Previously, only x-ray diffraction of bulk crystallized samples was capable of delivering this level of performance. The development of cryo-EM was recognized with the Nobel Prize award in chemistry in 2017 to Jacques Dubochet, Joachim Frank and Richard Henderson.

Although some large academic and industrial institutions possess in-house cryo-EM facilities, the equipment is generally cost prohibitive for investigators in smaller laboratories. Thus, data collection is commonly performed at external user facilities. One challenge with this arrangement is the reliable production of ultrathin vitrified water layers that hold the samples in special cryo-EM grids and assurance that as delivered these cryo-EM grids have sufficient sample quality to generate good SPA data. A primary cause of this is that ultrathin water layers are inherently unstable. Thus, exact control over the water layer thickness prior to formation of ultrathin vitreous water layers is difficult and current vitrification methods can be quite irreproducible.

Vitrification equipment and methods span a wide range of complexity. The most straightforward and original method is simple hand plunging of grids into a cryogenic bath. As one might expect, this method is quite unreliable and usable sample yield is low. A more sophisticated and widely used robotic device is the Vitrobot® marketed by Thermo Fisher. This tool permits more reproducible vitrification of sample grids.

Even more advanced and costly robotic systems have been introduced recently. SPT Labtech produces a very sophisticated and automated cryo-EM grid preparation tool called Chameleon® with the ability to precisely control and adjust the vitrification process based on sample behavior. Similarly, Nanoscience Instruments produces their VitroJet® product for cryo-EM grid preparation using cryogenic ethane jetting for vitrification and offers customizable ice thickness adjustments on every grid. Unfortunately, tuning of parameters for vitrification that produce quality samples often remains a trial-and-error process in each case. Therefore, although the ability to tune such tools is welcome, what is needed is a way to rapidly assess the performance of vitrification for each run at high precision and with near real-time feedback. With such data available regarding the state of the sample-grid ice, readjusting the vitrification parameters between runs until acceptable quality is reached could be readily achieved.

The problems of quality of vitrified water layers and samples are commonly addressed by using screening electron microscopes to verify sufficient sample quality before high-resolution data collection is attempted. However, this is highly time consuming and requires additional costly equipment. The more advanced robotic vitrification instruments include a visible light microscope with video camera to achieve some limited feedback about water layers on grids right before freezing. However, this information is rather limited, and not sufficient for determining if an ice layer will have the right characteristics for collecting good data under the electron microscope.

What is needed to advance the art is a rapid and low-cost screening tool that would provide rapid feedback from the vitrification process, and enable fine tuning of vitrification parameters. To satisfy this need the screening tool should be able provide at a low cost the ability to perform very high precision measurements of ice/vitrified layer thickness on the order of several nanometers. Furthermore, it would also be an advance over the art to provide information about thickness variation across individual holes in the cryo-EM grid. Finally, a desirable rapid screening tool would ideally also be capable of measuring sample parameters such as average particle concentration as well as sample aggregation.

OBJECTS OF THE INVENTION

In view of the shortcomings of the prior art, it is an object of the invention to provide a rapid screening tool for cryo-EM grids that allows for low-cost screening of cryo-EM grids to facilitate real-time optimization of vitrification procedures including the tuning of vitrification parameters and sample preparation parameters to yield high quality cryo-EM grids that are suitable for high resolution data collection on very costly advanced cryo-EM microscopes. Currently, in many cases, grids sent to these highly oversubscribed cryo-EM facilities are all too often found to be inadequate for permitting good data collection.

Another object of the invention is to provide a relatively simple cryo-EM grid screening tool to reduce, though typically not eliminate, sample preparation screening requirements using electron microscopy.

Still another object of the invention is to provide a screening tool for cryo-EM grids that can be used as a stand-alone instrument or be incorporated into complete robotic vitrification systems.

These and other objects and advantages of the present invention will become apparent upon review of the detailed description and the appended drawing figures.

SUMMARY

The benefits of the present invention are secured by a screening tool adapted for a cryogenic electron microscopy grid referred to as cryo-EM grid hereafter. The cryo-EM grid holds a sample that is typically a biological sample in an ultrathin vitrified water layer. The screening tool has a source for producing an inspection light beam at a vacuum ultraviolet (VUV) wavelength chosen in a range between 100 and 200 nm. Suitable sources are selected, without limitation, from among excimer lasers, hollow cathode metal vapor lasers, excimer lamps, deuterium lamps, high harmonic laser lines and other photon sources in the VUV wavelength range.

The screening tool has an evacuated optical dewar vessel design with a VUV input widow through which the inspection light beam is admitted into it. Once inside the evacuated optical dewar vessel the inspection light beam propagates along a defined optical path. The dewar is connected to a cryogen source. The cryogen source maintains a certain temperature within the evacuated optical dewar vessel to keep the conditions appropriate for the sample held in the ultrathin vitrified water layer.

The screening tool also has a holding structure for holding the cryo-EM grid with the sample in the optical path of the inspection light beam. The sample in the ultrathin vitrified water layer is thus exposed to the inspection light beam at the VUV wavelength. As a result of this exposure, the sample and the ultrathin vitrified water layer produce a response light. The screening tool has a light-detector for detecting the response light thus generated.

The screening tool takes advantage of the fact that the inspection light beam at the VUV wavelength experiences attenuation as it passes through the sample in the ultrathin vitrified water layer. Indeed, both the sample itself and the ultrathin vitrified water layer cause attenuation of the inspection light beam. Therefore, the response light contains information about both the sample and the ultrathin vitrified water layer. More precisely, the response light, depending on the VUV wavelength chosen, contains information about at least one physical parameter of the water layer or of the sample or even both.

Exemplary physical parameters of the ultrathin vitrified water layer that are of interest are its thickness, its uniformity and the proportion of holes in the cryo-EM grid that have the vitrified water layer. Exemplary physical parameter of the sample that is of interest is the concentration of suspended particles of interest in the ultrathin vitrified water layer. Knowledge of at least one physical parameter of either the sample or of the water layer or both permits the screening tool to rapidly determine the suitability of the cryo-EM grid for further processing.

The screening tool can examine the response light in two distinct configurations. In a first configuration the response light is examined directly. To accomplish that the response light is passed through a VUV output window of the dewar vessel and directly to the light-detector. In this configuration the light-detector is a VUV microscope that directly measures light at the VUV wavelength by producing a magnified image of the cryo-EM grid. This configuration is called VUV microscopy. It is essentially identical to bright-field light microscopy, but with a much shorter wavelength. This configuration introduces the need for much more demanding optical components and means for avoiding complete absorption of the inspection and response light by these components as well as by the intervening gas present in the optical path.

In a second configuration, the response light is converted to a longer wavelength response light that does not impose strict conditions on propagation as does VUV light. To convert the response light, a scintillator is positioned in close proximity to the cryo-EM grid or in direct contact. As the response light passes through the scintillator it is converted to a longer wavelength, e.g., in the optical or near-UV range. This configuration is called microfluoroscopy and it has the advantage of being adapted to a standard light-detector. More standard optical components can be used in this second configuration. Moreover, it is unnecessary that the optical path of the scintillator light that represents the response light in this configuration be purged of air with high purity nitrogen or another gas that is free of water vapor and oxygen.

The cryogen source belonging to the screening tool can be instantiated in several different ways. Preferably, the cryogen source uses a cryogenic medium such as a cold gas or a fluid. When using cold gas, the cryogen source preferably has a jet for directing a cryostream of the cold gas at the cryo-EM grid. When using a cryogenic fluid, the cryo-EM grid can either be kept right above the fluid surface or it can be immersed in the fluid. Maintaining the cryo-EM grid above the fluid has the advantage of not introducing additional optical effects and potential distortions into the beam path.

The holding structure that keeps the cryo-EM grid can take on many forms. Preferably, it has at least one transmissive plate in the optical path positioned right next to the cryo-EM grid to maintain flatness. The portion of the holding structure that actually grasps the cryo-EM grid is traditionally and also preferably in the context of the present invention embodied by tweezers.

In some embodiments the screening tool has a cuvette and the cryo-EM grid is held or kept in the cuvette. A cuvette has the attractive feature of having at least two flat sides to eliminate refractive deviation of light during sample illumination and/or viewing. However, other interior vessels such as ones of cylindrical cross-section or with one or more attached windows are also usable. This includes composite structures such as ones composed of both optically transmissive windows, along with metal support walls. With such metal cuvettes, a design employing a low thermal conductivity material such as thin-wall stainless steel is preferred. Hence, the term "cuvette" is used herein for any vessel that encloses the cryo-EM grid. This could be a traditional glass cuvette constructed with flat walls, or a vessel having a more complex geometry and constructed from different materials.

The cuvette is placed in the evacuated optical dewar vessel and in the optical path of the inspection light beam so as to expose the cryo-EM grid. In order to efficiently pass the inspection light beam at the VUV wavelength the cuvette needs to admit the light with minimal attenuation. Thus, in a typical case where the cuvette is made of fused silica it can have a thinned-out window for admitting the inspection light therethrough. Furthermore, in some embodiments the cuvette can itself contain the cryogenic medium. For example, the cuvette can contain the cryogenic fluid and the cryo-EM grid can be kept immersed in, or held above the cryogenic fluid.

Other optical materials based on fluoride crystals such as $MgF_2$ and $CaF_2$ transmit well in the VUV wavelength range below the cutoff of fused silica. However, these materials tend to shatter when cryogenically cooled. Sapphire optics have a cutoff wavelength fairly close to that of fused silica, but are more difficult to fabricate and they are costly. Another potential material is high purity crystalline quartz, instead of fused silica, but it too can be more demanding to fabricate. Thus, fused silica is considered a highly desirable material, but not the only one possible for this part of the system.

The invention also covers a method for screening a cryo-EM grid that holds a sample in an ultrathin vitrified water layer. The method calls for delivering an inspection light beam at a VUV wavelength from a suitable source and for admitting the inspection light beam into an evacuated optical dewar vessel through a VUV input window. The admitted inspection light beam propagates or travels along a defined optical path.

The method further calls for maintaining a certain temperature within the evacuated optical dewar vessel and holding the cryo-EM grid in the optical path. It is important to maintain the sample below the devitrification temperature of water. Thus, the sample in the ultrathin vitrified water layer is maintained at low temperature and exposed to the inspection light beam at the VUV wavelength to produce a response light as a result. In accordance with the method the response light is detected using a light-detector: most commonly embodied by a high sensitivity and low-noise electronic camera. Because the inspection light beam experiences attenuation as it passes through the sample in the ultrathin vitrified water layer it contains useful information about a physical parameter of either the ultrathin vitrified water layer or the sample or both. This information permits one to screen the cryo-EM grid to determine its suitability for further cryo-EM imaging.

The method can be deployed in two distinct configurations. In a first configuration the response light is examined directly by passing it through a VUV output window from the dewar to a VUV microscope. This configuration is called VUV microscopy. In a second configuration the response light is converted to a longer wavelength response light using a scintillator positioned proximate to the cryo-EM grid. This configuration is called microfluoroscopy.

The details of the invention will now be addressed in the detailed description and with reference to the drawing figures.

BRIEF DESCRIPTION OF THE DRAWING FIGURES

FIG. 1A is a perspective view showing the main features of a screening tool according to the invention operating in a first configuration or in the VUV microscopy mode FIG. 1B is a top plan view of the evacuated optical dewar vessel used in the screening tool of FIG. 1A FIG. 2 is a graph of the attenuation of light passing through liquid water FIG. 3 is an isometric view of a holding structure for holding a cryo-EM grid FIG. 4 is an isometric view showing the screening tool of FIG. 1A adapted for a second configuration in which the response light is converted to a longer wavelength using a scintillator FIG. 5A is an image of a fine metal mesh examined in the first configuration using VUV microscopy at 193 nm FIG. 5B is an image of a sample obtained in the first configuration using VUV microscopy at 193 nm FIG. 5C is a microfluoroscopic image of a clean cryo-EM grid obtained in the second configuration FIG. 5D is a microfluoroscopic image of a contaminated cryo-EM grid obtained in the second configuration FIG. 5E is a microfluoroscopic image of a clear area of an Au-Flat grid with 1.2 µm holes FIG. 5F is a microfluoroscopic image of the Au-Flat grid of FIG. 5E with thin unvitrified ice present FIG. 5G is a microfluoroscopic close up image of the Au-Flat grid of FIG. 5F showing another thin center region surrounded by thicker ice FIG. 6 is an isometric view showing an alternative holding structure for holding a cryo-EM grid with an enlarged portion showing a holey film that keeps samples in an ultrathin vitrified water layer FIG. 7A shows a portion of a screening tool that uses a cuvette for keeping a cryo-EM grid during screening FIG. 7B is a graph of the transmission curves for various grades of fused silica as provided by Heraeus for a mm thick wall FIG. 7C is a photograph of a typical fused silica cuvette, along with suitably produced example of a thinned-out window test piece for the cuvette as illustrated in FIG. 7A FIG. 8 is an image of a specific embodiment of a screening tool according to the invention

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

The present invention will be best understood by first reviewing a general configuration of a screening tool 100 according to the invention operating in the vacuum ultraviolet (VUV) microscopy configuration as shown in the perspective view of FIG. 1A. Screening tool 100 is designed to work with a cryogenic microscopy grid 102 referred to herein as cryo-EM grid. Cryo-EM grid 102 is illustrated in its proper place in screening tool 100 and in an enlarged view above screening tool 100 connected with dashed lines E1 to more clearly illustrate the structure of cryo-EM grid 102.

As seen in the enlarged view, cryo-EM grid 102 has a grid mesh 104 that is typically made of metal such as gold, nickel or copper. Grid mesh 104 typically has a mesh number of between 200 and 4,000 (200 to 4,000 openings or lines per inch). A still further enlarged view of a single grid 104N of grid mesh 104 connected by dashed lines E2 illustrates a very flat holey foil or holey film 106N that spans grid 104N and is typically made of gold (e.g., UltrAufoil® or Au-flat®) or carbon (e.g. Quantifoil™. In fact, holey film 106 covers all openings of grid mesh 104. For clarity of explanation, however, we refer to just holey film 106N portion in grid 104N in the present description. Further, it is worth noting that in some grids currently being developed, a single-atom thick graphene layer spans the opening of the individual holes to potentially provide a more stable sample environment.

Holey film 106N has in it a number of holes 108. One standard grid design commonly employed has holes 108 having a diameter of 1.2 μm and spacing material of 1.3 μm. Thus, the center-to-center distance is 2.5 μm. There are other standard grids commercially available with some variation of these dimensional parameters. Within each hole 108, as shown on the example of enlarged view of hole 108A connected with dashed lines E3, is an ultrathin vitreous water layer 110 containing a sample 112. The vitrification of water or production of vitreous ice or amorphous ice to form ultrathin vitreous water layer 110 that encloses sample 112 is already complete when cryo-EM grid 102 is placed in screening tool 100.

An important physical parameter of ultrathin vitrified water layer 110 to be screened is its thickness T. Ideally, thickness T of ultrathin vitreous water layer 110 is minimized to reduce background noise during further processing that ultimately includes cryo-EM examination of sample 112. The variability in thickness T should also be kept to a minimum. In most cases the thickness T encountered is about 10-100 nm.

However, during preparation and vitrification taking place prior to the screening of the present invention it is difficult to exercise control of thickness T and its variability. Ultrathin water layers are inherently unstable and thus exact control over the water layer thickness prior to formation of ultrathin vitreous water layer 110 is difficult. Indeed, it is largely due to these difficulties that there is a need for screening tool 100 to verify thickness T and its variability, preferably with a precision of several nanometers (nm).

Although only one exemplary sample 112 is shown in ultrathin vitreous water layer 110 in hole 108A, it will be appreciated that sample 112 may include a number of particles, e.g., a number of biological molecules, biological materials and/or complexes including proteins intended for analysis. Further, if cryo-EM grid 102 is properly prepared then most holes 108 across grid mesh 104 will hold ultrathin vitreous water layer 110 containing sample 112. Thus, wherever reference is made below to ultrathin vitreous water layer 110 and sample 112 it is to be understood that reference is made to entire grid 104 with holey film 106 in grid mesh 104.

Screening tool 100 is adapted for screening of cryo-EM grid 102 holding sample 112 in ultrathin vitreous water layer 110. For this purpose, screening tool 100 has a source 114 for producing an inspection light beam 116 at a vacuum ultraviolet (VUV) wavelength. For better visualization a few schematic photons 116' of light belonging to inspection light beam 116 are indicated in FIG. 1A.

The VUV wavelength of light 116' constituting inspection light beam 116 is chosen in a range between about 100 nm and 200 nm. Suitable sources of VUV light to be used as source 114 in this wavelength range include but are not limited to excimer lasers, hollow cathode metal vapor lasers, excimer lamps, deuterium lamps and high harmonic laser lines. The exact choice of source 114 will depend on a number of parameters discussed below.

The atmosphere is strongly absorbing in the 100 nm to 200 nm range, with rapidly increasing attenuation as wavelength is reduced. In fact, the term VUV originated due to the high absorption to light in the 100 nm to 200 nm range in air, which precludes transmission through the atmosphere for any appreciable distance. The attenuation in air is below 1 mm at 157 nm. This high attenuation is primarily due to oxygen present in the atmosphere/air. In addition, water in either vapor or condensed phase is also highly attenuating over the 100 nm to 200 nm wavelength range. Indeed, it is the high attenuation in this VUV wavelength range in liquid and solid water phases that is the primary ingredient in the present invention.

In contrast, high purity nitrogen as well as the noble gases (and their liquid forms) transmit well throughout most of this wavelength range. For this reason, these gases/liquids are used in the present invention as cryogenic media and as purge gases, as discussed in more detail below.

In the present case source 114 is a molecular fluorine ($F_2$) laser operated in standard excimer laser system to emit collimated and narrowband inspection light beam 116. There are commercially available mini excimer lasers that are very compact, relatively low-cost, and simple to operate. The main issue in operating such source 114 over more conventional non-excimer lasers is the need to exchange laser gas periodically, and to provide safety measures for handling toxic and corrosive fluorine. Regarding the latter, the fluorine concentration in $F_2$ premix gas is only ≈0.1%, which minimizes handling issues. The attenuation length in water of ≈60 nm, as discussed below in conjunction with FIG. 2, is well suited for this application. Collimated inspection light beam 116 produced by such laser is also desirable for efficient illumination of sample 112. Further, the highly collimated inspection light beam 116 obtained from the $F_2$ laser also makes it much easier to reject disturbing out-of-band light from the source's plasma. This is especially convenient in imaging.

In the present embodiment, in order to limit attenuation of inspection light 116' in air a tube 118 filled or purged with a suitable gas is provided to ensure that inspection light beam 116 is able to propagate with minimal attenuation. In the present example, tube 118 is purged with nitrogen to ensure propagation of inspection light beam 116.

Screening tool 100 has an evacuated optical dewar vessel 120 with a VUV input widow 122 through which inspection light beam 116 is admitted into it. Dewar vessel 120 is shown in FIG. 1A without the top wall and with a cut-out corner portion 121 to afford unobstructed view of the inside. To avoid the need for an attached vacuum pump, dewar vessel 120 is evacuated with a turbomolecular pump and sealed with a Cu pinch-off tube. It will be appreciated by those skilled in the art that various other options for evacuating dewar vessel 120 are available, but those that avoid a continuously running vacuum pump are preferred for convenience. Vacuum level within dewar vessel 120 is not demanding, with a pressure below approximately $10^{-3}$ Torr being enough to provide sufficient thermal isolation. A separate liquid nitrogen cold finger (cold trap) is also useful to remove any residual water vapor in dewar vessel 120 of this screening tool 100 before cooling. Removal of such residual water vapor prevents any disturbing ice condensation on the viewing/illumination areas of system 100, and on any cuvette within which cryo-EM grid 102 may be positioned within dewar vessel 120, as described in more detail below.

Inside evacuated optical dewar vessel 120 inspection light beam 116 propagates along an optical path 124 that passes straight through dewar vessel 120. No additional optical elements, i.e., no beam conditioning optics or reflective steering optics to fold or adjust optical path 124 are used in the present embodiment. More precisely, optical path 124 traverses dewar vessel 120 from VUV input window 122 to a VUV output window 126 in the opposing side wall.

FIG. 1B affords a top plan view of evacuated optical dewar vessel 120 that illustrates VUV input window 122 and VUV output window 126 in more detail. VUV input window 122 has a room temperature window 122A and a cryogenic window 122B. The space between room temperature window 122A and cryogenic window 122B is evacuated to support propagation of inspection light beam 116. Similarly, VUV output window 126 has a room temperature window 126A and a cryogenic window 126B with evacuated space between them.

In order to maintain the required low temperature, evacuated optical dewar vessel 120 has a cryogen source 128. The present embodiment uses a simple cryogen source 128 embodied by a container and supply (not shown). Cryogen source 128 uses a cryogenic medium 130 in the form of a cryogenic fluid. Cryogenic fluid 130 may be in the form of liquid nitrogen (LN) or liquid argon and it may fill the space inside dewar vessel 120 between VUV input and output windows 122, 126. Cryogenic fluid 130 of this type is transparent to light in the VUV wavelength range when free of oxygen contamination. Thus, optical path 124 can pass through cryogenic fluid 130. Alternatively, cryogenic fluid 130 may reside below the level of VUV input and output windows 122, 126.

Returning to FIG. 1A, in this exemplary embodiment cryogenic fluid 130 is seen not to reach up to the level of VUV input and output windows 122, 126. The space above cryogenic fluid 130 is nonetheless kept at a cryogenic temperature because of the cold gas phase of cryogenic fluid above liquid level.

Cryo-EM grid 102 is held in dewar vessel 120 above the liquid level of cryogenic fluid 130. In that region the gas phase of cryogenic fluid 130 maintains the temperature conditions appropriate for inspection of ultrathin vitrified water layer 110 and sample 112.

Screening tool 100 has a holding structure 132 for holding cryo-EM grid 102 with sample 112 in optical path 124 of inspection light beam 116. Sample 112 in the ultrathin vitrified water layer 110 is thus exposed to inspection light beam 116 at the VUV wavelength. In the present embodiment holding structure 132 is made of a pair of tweezers that grip cryo-EM grid 102 at its periphery and hold it in optical path 124 of inspection light beam 116. Exposure to inspection light beam 116 of sample 112 in ultrathin vitrified water layer 110 produces a response light 134 that represents a transmitted portion of inspection light beam 116. Response light 134 continues to propagate along optical path 124 and exits dewar vessel 120 through VUV output window 126.

Screening tool 100 has a light-detector 136 positioned next to VUV output window 126 for detecting response light 134 thus generated. In the present embodiment designed for VUV microscopy light-detector 136 is a microscope analogous to normal light microscope but designed for VUV wavelengths. More precisely, microscope 136 is adapted to view response light 134 at the chosen VUV wavelength of inspection light beam 116.

In order to employ high numerical aperture (NA) objectives for achieving the highest possible resolution, it important that the size of the gap between VUV output window 126 and VUV microscope 136 be kept as small as possible to reduce working distance. Reentrant viewports are a practical approach for dealing with this issue. The rather large gaps shown in FIG. 1A between VUV microscope 136 and VUV output window 126 as well as between tube 118 and VUV input 122 are there for reasons of visual clarity. It will be clear to a skilled artisan that all parts of optical path 124 from VUV output window 126 to camera or microscope 136 must be purged with a pure gas like nitrogen, and that VUV compatible optics must be used. For this reason, VUV microscopy of the first configuration is more technically demanding than microfluoroscopy using longer wavelength scintillator light and described below in the second configuration of screening tool 100.

During operation screening tool 100 takes advantage of the fact that inspection light beam 116 in the VUV wavelength range experiences attenuation as it passes through sample 112 and ultrathin vitrified water layer 110 held in cryo-EM grid 102. The amount of attenuation experienced by VUV wavelength inspection light beam 116 due to sample 112 and due to ultrathin vitrified water layer 110 generally differ. Also, the amount of attenuation depends on the exact VUV wavelength that is chosen.

FIG. 2 is a graph 138 of the attenuation experienced by light as it passes through liquid water for wavelengths that range from nm to 10 mm plotted on the x-axis. The y-axis shows the attenuation in terms of attenuation coefficient 1/m (an attenuation of 1 means that the light is attenuated by a factor of 1/e through 1 m of water). It is noted that the attenuation of light passing through vitrified water of ultrathin vitrified water layer 110 is similar to the attenuation that light experiences when passing through liquid water. It is further of interest that at a VUV wavelength of 157 nm the absorption length (1/e attenuation factor) is ≈60 nm.

Now, particles of sample 112 are also absorbing in the VUV wavelength range. However, because water makes up the bulk of ultrathin vitrified water layer 110 it introduces a relatively small correction factor that a person skilled in the art can take into account. Light at VUV wavelength is, of course, ionizing radiation and therefore radiation damage to sample 112 has to be considered. Fortunately, much lower dosages are incurred during the relatively low-resolution screening of cryo-EM grid 102 in accordance with the invention. Photons of inspection light 116' are typically limited to energies below 10 eV and thus lower than photon energies encountered in high resolution electron microscopy.

A VUV wavelength window or range 140 of interest for use in screening tool 100 is indicated on graph 138. In VUV range 140 light experiences a rapid change in the amount of absorption. Because of the high attenuation coefficient in range 140 VUV light is highly sensitive to physical parameters of ultrathin vitrified water layer 110, e.g., its thickness T, and is thus deployed in the present invention. Although entire range 140 is of interest it is noted that shorter VUV wavelengths (below ≈150 nm) can present technical challenges with materials of VUV input and output windows 122, 126 (see FIG. 1B) in some embodiments. For this reason, a VUV wavelength above 150 nm such as 157 nm is of special interest for use in inspection light beam 116 as it can be easily generated when an excimer laser is used as source 114 (see FIG. 1A).

Meanwhile, VUV inspection light beam 116 passing through sample 112 exhibits a different amount of attenuation. Typically, the organic materials of sample 112 exhibit higher attenuation and thus a higher sensitivity in the longer wavelength range portion of VUV wavelength window 140. For example, a VUV wavelength of about 193 nm is advantageous for examining physical parameters of sample 112. As in the case of light at VUV wavelength of 157 nm, the 193 nm wavelength can also be generated by an excimer laser acting as source 114 (see FIG. 1A).

We return now to FIG. 1A with source 114 being an excimer laser at VUV wavelength of 157 nm. Inspection light beam 116 at 157 nm passes through purged tube 118 and arrives at VUV input window 122. At this point, inspection light 116' enters dewar vessel 120 through VUV input window 122 and continues to propagate along optical path 124. While traveling within dewar vessel 120 inspection light beam 116 encounters cryo-EM grid 102 that is held in optical path 124 by tweezers 132.

As inspection light 116' passes through sample 112 and ultrathin vitrified water layer 110 held in cryo-EM grid 102 it experiences attenuation. By reviewing graph 138 of FIG. 2 it is clear that the attenuation is significant and in excess of $10^7$/m at VUV wavelength of 157 nm. The attenuation of response light 134 in comparison to inspection light beam 116 thus contains information of interest in the present invention. This information is carried by response light 134 through VUV output window 126 to VUV microscope 136. The view of response light 134 across its beam cross-section afforded by VUV microscope 136 visualizes that information.

First, response light 134 produced from inspection light 116' passing through ultrathin vitrified water layer 110 holding sample 112 contains information about ultrathin vitrified water layer 110. The beam cross-section of response light 134 exhibits local attenuation or absorption contrast that corresponds to local thickness T at corresponding locations of cryo-EM grid 102 that inspection light beam 116 traverses. Because of the large amount of attenuation in response light 134 even variability in thickness T on the order of a few nm is ascertained with inspection light 116' at 157 nm. In fact, the physical parameters of ultrathin vitrified water layer 110 that can thus be inspected by VUV microscope 136 based on information contained in response light 134 include thickness T, uniformity and the proportion of holes 108 in cryo-EM grid 102 that have vitrified water layer 110 in them.

Second, response light 134 also carries information about sample 112. As noted above, however, at VUV wavelength of 157 nm most sample materials of interest do not produce much signal. On the other hand, at VUV wavelength of 193 nm sample 112 does interact with inspection light beam 116 and thus does contain information about sample 112. An exemplary physical parameter of sample 112 that is of interest is the concentration of suspended particles of sample 112 that are trapped in ultrathin vitrified water layer 110. It should be appreciated that the use of VUV light somewhat longer than 200 nm (outside the conventional definition of VUV) is also possible for performing some measurements of physical parameters of sample 112 such as its concentration and distribution. However, this is clearly not the case for the vitrified water supporting holey film 106, which requires wavelengths well below the long wavelength limit of the VUV spectral range or window 140 (see FIG. 2) to achieve sufficient attenuation. To make this point clear, immersion lithography is the semiconductor industry is now commonly performed at 193 nm using ArF lasers through relatively large water layers.

Now, screening tool 100 can examine response light 134 in two distinct configurations. FIG. 1A shows the first configuration in which response light 134 is examined directly by being passed on to VUV microscope 136. VUV microscope 136 examines response light 134 by imaging. This first and simplest configuration thus images cryo-EM grid 102 by bright-field transmission optical microscopy at VUV wavelengths.

Although this is the simplest configuration it has a number of practical challenges that result in high cost. The production of high precision microscope objectives required by VUV microscope 136 is challenging in VUV wavelength window 140, and especially at the shorter wavelengths in window 140 (see FIG. 2). In addition, VUV microscope 136 requires a camera with high VUV quantum efficiency. High quality VUV imaging optics are required, and the entire portion of optical path 124 through VUV microscope 136 must be purged with pure VUV transmitting gas. Further, VUV wavelengths much below 193 nm present challenges for refractive optics, since fluoride crystals need to replace fused silica optical elements. Not only are they more difficult to manufacture, but their birefringence is problematic. In addition, it is presently not feasible to design a refractive VUV objective when source 114 is a non-laser source due to dispersion issues.

All-reflective objectives that are suitable for use at these shorter wavelengths in window 140 and are also achromatic do exist. The most common geometry is the two-mirror Schwarzchild objective. One challenge is spherical aberration correction for the objective due to the necessary viewing windows in screening tool 100. Schwarzchild objectives are typically not very high-NA, but this is not a large impediment. VUV microscopy configuration of screening tool 100 at VUV wavelength of 157 nm with a 0.25 NA objective still provides a diffraction limited resolution of 380 nm.

The challenging conditions encountered in VUV microscopy at the short wavelengths and partly identified above can be ameliorated by several additional aspects of the invention. Specifically, the issues affecting the optics as well as those pertaining to the imaging challenges are addressed below. Like reference numerals are used to designate analogous parts and for clarity of explanation.

FIG. 3 illustrates an embodiment of a holding structure 150 that can be used in screening tool 100 instead of tweezers 132 for holding cryo-EM grid 102 in a manner that improves the optics performance while operating in the first configuration (VUV microscopy). In this embodiment, holding structure 150 is still in the form of tweezers but it is further equipped with transmissive plates 152, 154. Transmissive plates 152, 154 are positioned in optical path 124. They can have the exact same dimensions or different dimensions.

What is important, however, is that transmissive plates 152, 154 be thin and able to gently pinch cryo-EM grid 102 between them. To accomplish the pinching effect transmissive plates 152, 154 need to be flat and positioned right next to cryo-EM grid 102 on either side. The optical purpose of transmissive plates 152, 154 is to provide a flat focal plane at a consistent location to aid in proper imaging of response light 134 by VUV microscope 136.

Plates 152, 154 are also helpful in dealing with certain aspects of preparation of cryo-EM grid 102 produced prior to its screening according to the present invention. Specifically, vitrification of ultrathin vitrified water layer 110 is normally accomplished by either rapidly plunging cryo-EM grid 102 with an ultrathin aqueous layer (that will vitrify to form layer 110) containing sample 112 into a cryogenic fluid, or by spraying cryo-EM grid 102 with a cryogenic fluid jet. There are a number of different vitrification devices commercially available and additional equipment is under development. Means to minimize the time between application of the ultrathin aqueous layer that contains sample 112 to cryo-EM grid 102, and subsequent vitrification are advantageous for minimizing artifacts. The most common cryogens are hydrocarbons like ethane cooled by liquid nitrogen (LN) to near their melting point. Lowering the temperature well below the boiling point prevents formation of an insulating layer of vaporized cryogen, which greatly reduces heat transfer (Leidenfrost effect) and slows vitrification.

It must be noted that hydrocarbons are also highly attenuating in the VUV wavelength range. Therefore, it is necessary to remove any residue of this liquid before screening cryo-EM grid 102 with inspection light beam 116 at the VUV wavelength. Fortunately, this is readily accomplished by rinsing cryo-EM grid 102 in a clean LN bath, as the solubility of hydrocarbons like ethane is significant in LN. Alternatively, the vapor pressure of ethane is high enough that it may be evaporated from a vitrified grid by raising to a temperature that is still below the devitrification temperature of ice. The water devitrification temperature is commonly considered to be about 120° K, while ethane has a vapor pressure of 1 Torr at about 114° K. This is sufficient to evaporate a thin layer of ethane residue in a reasonable time frame if a proper arrangement is used to remove the volatized ethane.

After vitrification and removal of any hydrocarbon residue, the cryo-EM grid 102 can be examined. At this point the sandwich formed by transmissive plates 152, 154 on either side of cryo-EM grid 102 serves as effective protection against contamination against any further contamination (e.g., ice crystals).

There has been some developmental work on vitrification schemes that do not rely on liquid ethane as the freezing fluid. This has involved the use of liquid nitrogen having a layer of room temperature gas introduced at the liquid surface immediately before cryo-EM grid 102 is plunged into the fluid. Initially, tests have indicated that a larger issue than the Leidenfrost effect may be slow freezing in the normally present cold gas layer above the liquid. Thus, it may very well be practical to eliminate ethane freezing in the future and its attendant VUV absorption issues. In addition to liquid nitrogen (LN) freezing, some recent work using a cold gaseous jet (Cryostream) of nitrogen have been reported. Ethane-free vitrification would be very attractive for this invention, which uses VUV light that is highly attenuated in thin layers of hydrocarbons such as residual ethane. Moreover, an integrated system where vitrification is followed by immediate VUV screening of cryo-EM grid 102 would be an extremely attractive improvement over current procedures.

At the longer VUV wavelengths within window 140 (see FIG. 2) the first configuration as implemented in the embodiment of FIG. 1A is less challenging. Specifically, operating when tweezers 132 hold cryo-EM grid 102 immersed directly in cryogenic fluid 130 such as liquid nitrogen and using VUV wavelength of 193 nm in bright-field inspection is considerably easier. That is because it is possible to leverage the significant optical design progress achieved in the photolithography industry. Of course, VUV wavelength of 193 nm is not suitable for absorption contrast study of vitrified water layer 110, as evident from graph 138 in FIG. 2. However, this wavelength is suitable for obtaining information about physical parameters of sample 112.

A second configuration of screening tool 100 is very similar to the first configuration (i.e., VUV microscopy) shown in FIG. 1A. The second configuration addresses some of the optical challenges by working with longer wavelength response light. An exemplary second configuration is explained by referring to screening tool 100 as shown in FIG. 1A and additional screening tool parts.

FIG. 4 is an isometric view showing parts of screening tool 100 that are compatible with the second configuration in which response light is converted to a longer wavelength. Only some parts of screening tool 100 are shown for clarity and the same reference numerals are used to denote analogous parts. In this embodiment inspection light beam 116 composed of inspection light 116' schematically designated by photons is produced and delivered into evacuated optical dewar vessel 120 (only part of wall and VUV output window shown) along optical path 124 as in the embodiment described above. In this embodiment, cryogenic fluid 130 such as liquid nitrogen (LN) or liquid argon free of oxygen contamination fills dewar vessel 120 such that cryo-EM grid 102 is submerged or immersed. In other words, optical path 124 passes through cryogenic fluid 130.

Inspection light 116' is at the VUV wavelength of 157 nm. Inspection light beam 116 passes through cryo-EM grid 102 held by a holding structure 160 in optical path 124.

Holding structure 160 has a scintillator 162 attached to it at the end that holds cryo-EM grid 102. Scintillator 162 is attached to holding structure 160 such that it is positioned right next to cryo-EM grid 102 and in optical path 124. Scintillator 162 is designed for an unusual form of fluoroscopy—a technique those skilled in the art will commonly associate with x-ray inspection rather than VUV optics. Specifically, scintillator 162 is designed to convert inspection light beam 116 at VUV wavelength of 157 nm to a response light beam 164 at a visible wavelength or a near-UV wavelength. Response light itself is also indicated schematically by its photons 164' for further clarity.

In practice, cryo-EM grid 102 immersed in cryogenic fluid 130 is placed in close proximity and preferably in direct contact with scintillator 162. Preferably, scintillator 162 is a flat and grainless fluorescent medium such that cryo-EM grid 102 can rest against it. Single crystal scintillators such as cerium doped yttrium aluminum garnet (YAG:Ce) or lutetium aluminum garnet (LuAG:Ce) are attractive for use as scintillator 162 as they introduce no structure to the fluorescent image created by scintillator 162 from inspection light 116'. These materials also have very attractive mechanical properties that make them suitable for producing highly polished and rugged plates that do not easily scratch, crack and/or cleave. Still, a person skilled in the art is advised that many different materials can be used in scintillator 162. Examples of suitable scintillators include inorganic single-crystal scintillators, ceramic scintillators, glass scintillators, plastic scintillators and organic scintillators.

Several other aspects should be considered when choosing the material and other parameters of scintillator 162. The attenuation length of VUV light should be extremely short to reduce disturbing out-of-focus scintillator light. This is more of an issue with longer wavelength illumination such as 193 nm, which can benefit from using different materials with higher attenuation than YAG:Ce or LuAG:Ce. The bandgap of scintillator 162 has the largest influence on the absorption length of the illumination light, i.e., of inspection light 116'. Preferably, scintillator 162 made of single-crystal scintillator materials possess a cubic crystal structure to prevent optical distortion of the viewed image due to birefringence. Of course, this also holds for scintillator 162 made of amorphous (glassy) materials. Very thin scintillator layers bonded onto thicker transparent backing plates are attractive options for use as scintillator 162. That is because such type of construction can ameliorate the effects of birefringence. In fact, Crytur Ltd., a technology company based in Czechia, produces high-quality scintillator imaging screens on substrates with ultra-smooth polished scintillator layers as thin as 5 microns.

Due to the direct contact between cryo-EM grid 102 and scintillator 162, the latter produces a contact image in visible or near-UV wavelength response light 164 as a beam that keeps propagating along optical path 124. The contact image is a luminescent shadow of grid mesh 104 with its grid holes that contain sample 112 in ultrathin vitrified water layer 110 within holes 108 belonging to holey film 106 (see FIG. 1A).

Since response light 164' is at a significantly longer wavelength than inspection light 116', its handling does not impose the strict conditions on propagation involved in handling inspection light beam 116 at VUV wavelength. Hence, an output window 166 in a wall 120' of dewar vessel 120 does not need to be configured to handle VUV wavelength light.

Similarly, the region or gap between output window 166 and a light-detector 168 does not need to be evacuated or purged to handle propagation of VUV wavelength light.

Light-detector 168 in the present embodiment is a standard light-detector such as a light microscope that observes response light beam 164. Response light beam 164 carries the VUV contact image of cryo-EM grid 102 produced at scintillator 162. Response light 164' is observed by light microscope 168 to view the grid holes 104 and to map thickness T of ultrathin vitrified water layer 110 and/or of the unwanted ice formed in holes 108 (see FIG. 1A). Light microscope 168 uses less costly visible light objectives and detection cameras. However, the objective needs to be corrected for viewing through thick glass windows that make up VUV output window 166. Fortunately, such objectives are commercially available. Thus, the second configuration involving microfluoroscopy with scintillator 162 requires much less development of suitable components, and is easier and less costly to implement than VUV microscopy practiced in the first configuration.

It should be appreciated that the two configurations of screening tool 100 described above can be adjusted and tuned in many ways. This includes the selection of source 114, VUV wavelength of inspection light 116', imaging optics and imaging parameters of VUV microscope 136 or light microscope 168, depending on configuration, as well as cryogenic fluid 130 and method of maintaining cryo-EM grid 102 at the proper low temperature. The selection of optimal scintillator 162 is an additional important choice for optimizing performance in the microfluoroscopy configuration.

Some specific adjustments and further elements that can be deployed in the two configurations of cryo-EM screening tool 100 are described below. First, to appreciate some practical implementations we review test images obtained with screening tool 100 operating in the first configuration.

FIG. 5A is an image of a metal mesh obtained in the first configuration practicing VUV microscopy at 193 nm VUV wavelength of inspection light 116' where source 114 is an excimer laser. VUV microscope 136 uses a Zeiss hybrid objective lens. The image shows grid 104 that is made of nickel and has a period of 12.7 μm (2,000 lines per inch).

FIG. 5B is an image of sample 112 (dark dots) embodied by several μm latex microspheres deposited on a $CaF_2$ substrate. This image is also obtained in the first configuration practicing VUV microscopy at 193 nm VUV wavelength of inspection light 116' where source 114 is an excimer laser. The measured step-profile of the mesh edges indicates a resolution near 0.22 μm. The Rayleigh-Criterion resolution figure (minimum resolvable separation) is 0.18 μm. Close to diffraction limited performance can be achieved in this set up. Improvements can also be attained by using a solid immersion lens (SIL) made of fused silica.

FIG. 5C is a microfluoroscopic image of cryo-EM grid 102 obtained by light microscope 168 operating in the second configuration. In this particular case cryo-EM grid 102 uses an Au-Flat(c) TEM grid (1.2 μm holes/2.5 μm period). As seen in this image, cryo-EM grid 102 is newly filled with ultrathin vitrified water layer 110 and clean immersed in liquid argon serving as cryogenic fluid 130. Light microscope 168 uses a 50×/0.5 NA (Numerical Aperture) objective and a 2× magnification changer.

FIG. 5D is also a microfluoroscopic image of cryo-EM grid 102 obtained by light microscope 168 operating in the second configuration. Here, cryo-EM grid 102 is seen contaminated after a certain time with ice particles. The 50× objective without magnification changer was used by light microscope 168 in taking this image. The high attenuation and contrast from fine ice particles is clearly visible (dark regions across holey film 108—also see FIG. 1A).

FIG. 5E is a microfluoroscopic image of another cryo-EM grid embodied by an Au-Flat grid with 1.2 μm holes and in which the VUV wavelength of inspection light 116' is 157 nm. In this case holding structure 132 is embodied by tweezers (and more precisely still by "Fluorotweezers", as described below). The area shown in this image is clear.

The above general embodiments of the screening tool describe the basics required to operate it in the two distinct configurations to perform rapid screening of cryo-EM grids. The two distinct configurations admit of many specific embodiments. Furthermore, there are many possible alternatives in the mechanical, optical and cryogenic portions of the screening tool, some of which can be practiced in both configurations and some of which are only appropriate for one of the configurations. A number of these alternatives and specifics are described below.

Figure 6:
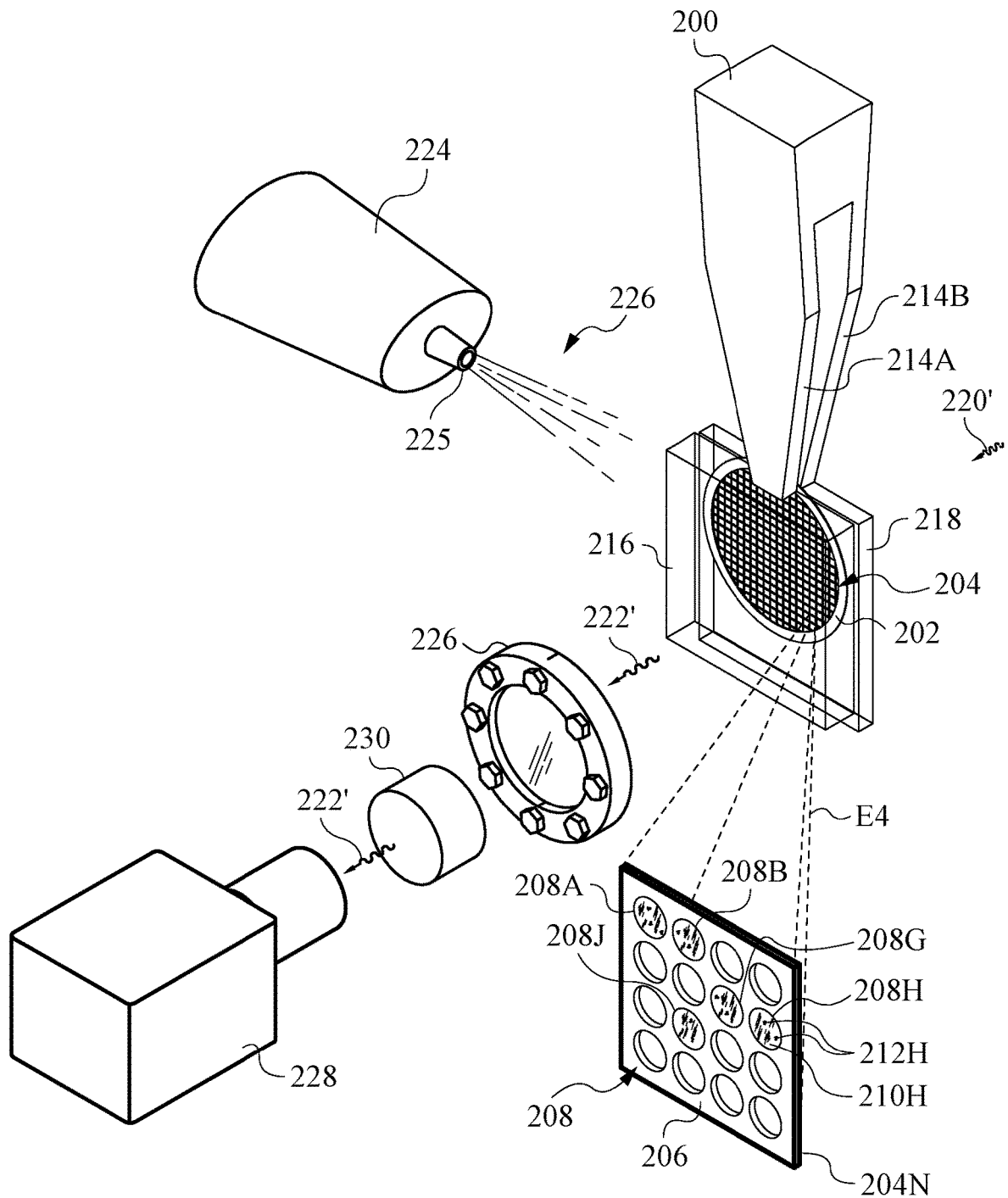

FIG. 6 illustrates another embodiment of a holding structure 200 for holding cryo-EM grid 202. Cryo-EM grid 202 has a grid mesh 204. An enlarged view of a single grid 204N of grid mesh 204 is shown connected with dashed lines E4 to more clearly illustrate a portion of holey film 206 that spans grid 204N and has holes 208. Of course, as in the previous embodiment, holey film 206 spans entire grid mesh 204.

In the present example 5 holes 208A-B, 208G, 208H and 208J of holey film 206 within grid 204N are properly prepared and hold the ultrathin vitrified water layer with embedded sample. For clarity of explanation, we subdivide the water layer and the sample and assign them to holes 208A-B, 208G, 208H and 208J in holey film 206 spanning mesh 204N. Correspondingly, holes 208A-B, 208G, 208H and 208J contain ultrathin vitrified water layers 210A-B, 210G, 210H, 210J with corresponding samples 212A-B, 212G, 212H and 212J.

Only hole 208H is fully designated with its ultrathin vitrified water layer 210H and sample 212H for reasons of visual clarity. We note that sample 212H typically includes many biological particles embedded in ultrathin vitrified water layer 210H spanning hole 208H, as is also true for other holes 208. Furthermore, sample 212H can be made up of various biological materials and/or complexes including proteins. The remaining holes 208 in holey film 206 spanning grid 204N are empty and devoid of either ultrathin vitrified water layer 210 or sample 212. In the present example these empty holes 208 were not properly prepared during the previous vitrification stage that precedes the screening according to the invention.

Holding structure 200 has two tines 214A, 214B for holding a cryo-EM grid 202. Holding structure 200 can be a part of a complete robotic vitrification system that actually performs the vitrification prior to screening of cryo-EM grid 202. In this case the screening tool of invention may be integrated with or incorporated into such complete vitrification system that delivers cryo-EM grid 202 with holes 208 of holey film 206 filled with ultrathin vitrified water layer 210 holding sample 212.

Holding structure 200 is adapted for use in microfluoroscopy or in the second configuration of the screening tool. While screening is being performing the holding structure 200 is positioned inside an evacuated optical dewar vessel (not shown) to which it can be brought from the vitrification part of the system.

Tine 214A has attached to it a scintillator 216. Further, holding structure 200 also has a transmissive plate 218 attached to tine 214B. Cryo-EM grid 202 is held by holding structure 200 using tines 214A, 214B to pinch it between transmissive plate 218 and scintillator 216. Scintillator 216 is designed to convert an inspection light 220' at the VUV wavelength to a longer wavelength response light 222' at UV, near-UV or visible wavelength.

Holding structure 200 previously described in detail for holding cryo-EM grid 202 between flat transmissive plate 218 and scintillator 216 plate can be called a "Fluorotweezer". It has the advantage of holding cryo-EM grid 202 in close contact to scintillator 216, and also protecting cryo-EM grid 202 from ice condensation contamination during transfer between the cryo-EM grid storage container (not shown) and the screening tool of the present invention. Cryo-EM grid 202 can be removed directly from cryo-storage using this unusual and protective tweezer configuration holding structure 200. In principle, a thin spacer layer could be incorporated on scintillator plate and/or transmissive plate 216, 218 to keep cryo-EM grid 202 material away from direct contact with plates 216, 218 by a few microns (only direct contact occurring on outer rim of cryo-EM grid 202). However, gentle direct contact is not expected to be problematic, as the thin grid membrane material is normally a few microns recessed below the coarser support structure anyway. Even if not, experience has shown that these ultrathin membranes are resistant to damage with gentle contact.

One other issue is the use of cryo-EM grid 202 of the type that is already clipped into a more rugged assembly (Autogrids), which are introduced into the electron microscope. In this case, it is not possible to get a very small gap between grid holes and flat scintillator 216 due to the thickness of the clipping structure. However, this can be addressed with scintillator 216 having a projecting surface machined onto it, which fits inside the clip's inside diameter. Alternately, the solid immersion lens (SIL) and microsphere embodiments described below are also well suited for use with clipped grids.

FIG. 6 also shows another embodiment of a cryogen source 224 that belongs to the screening tool. Cryogen source 224 uses a cryogenic medium 226 in the form of a cold gas. Cryogen source 224 has a nozzle or jet 225 for directing a cryostream of cold gas 226 at cryo-EM grid 202. In this example, the cryostream is composed of nitrogen gas 226 at around 90° K. Such cryostream is obtained from evaporated liquid nitrogen. The liquid nitrogen, in turn, is drawn from a dewar (not shown) that is part of cryogen source 224.

Figure 1A:
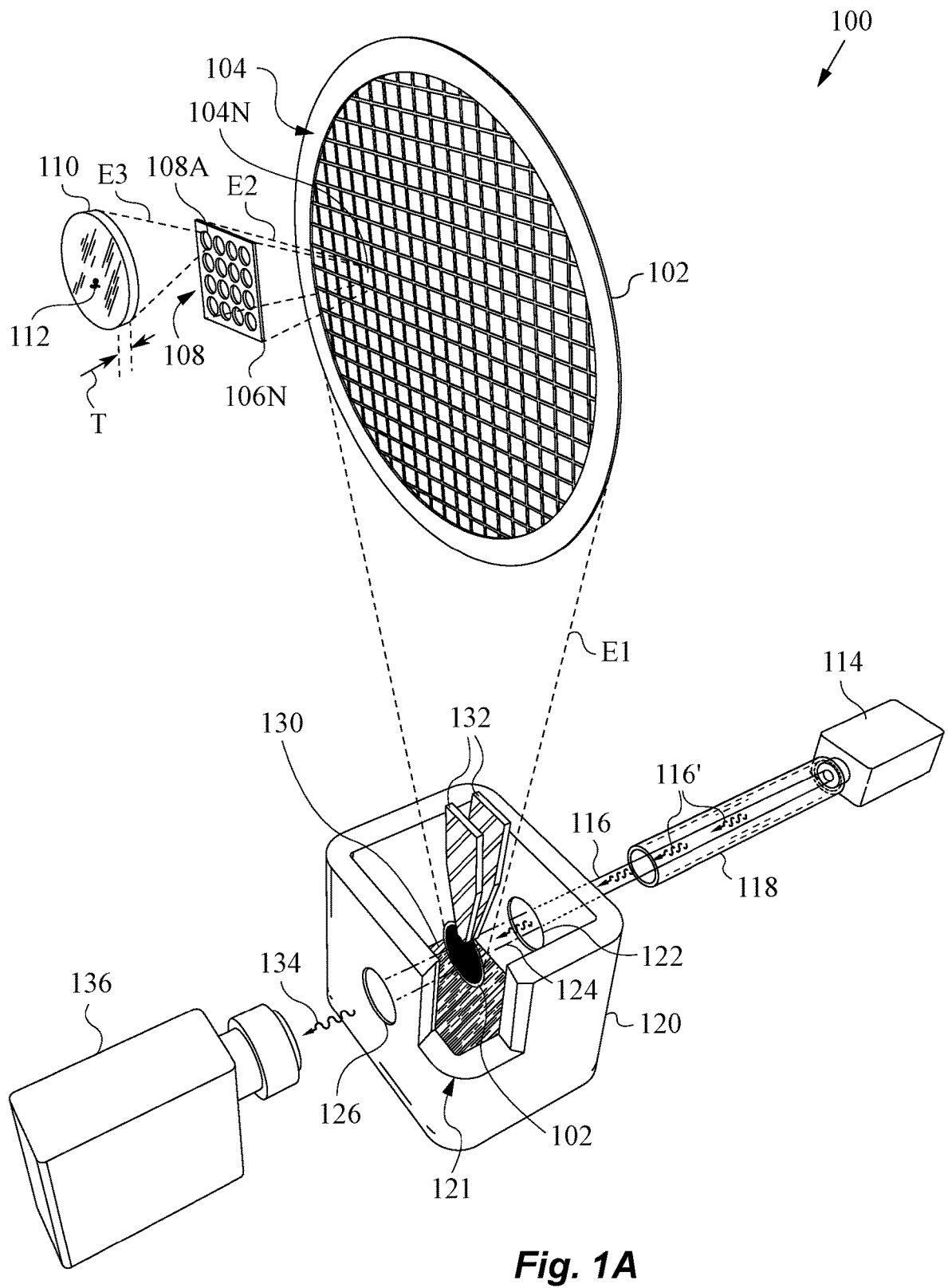
Figure 1B:
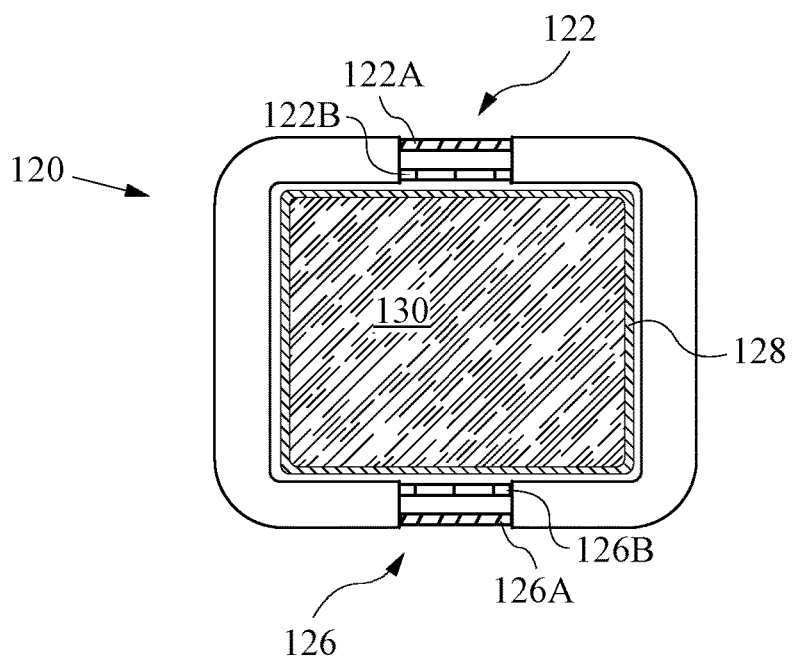
Figure 2:
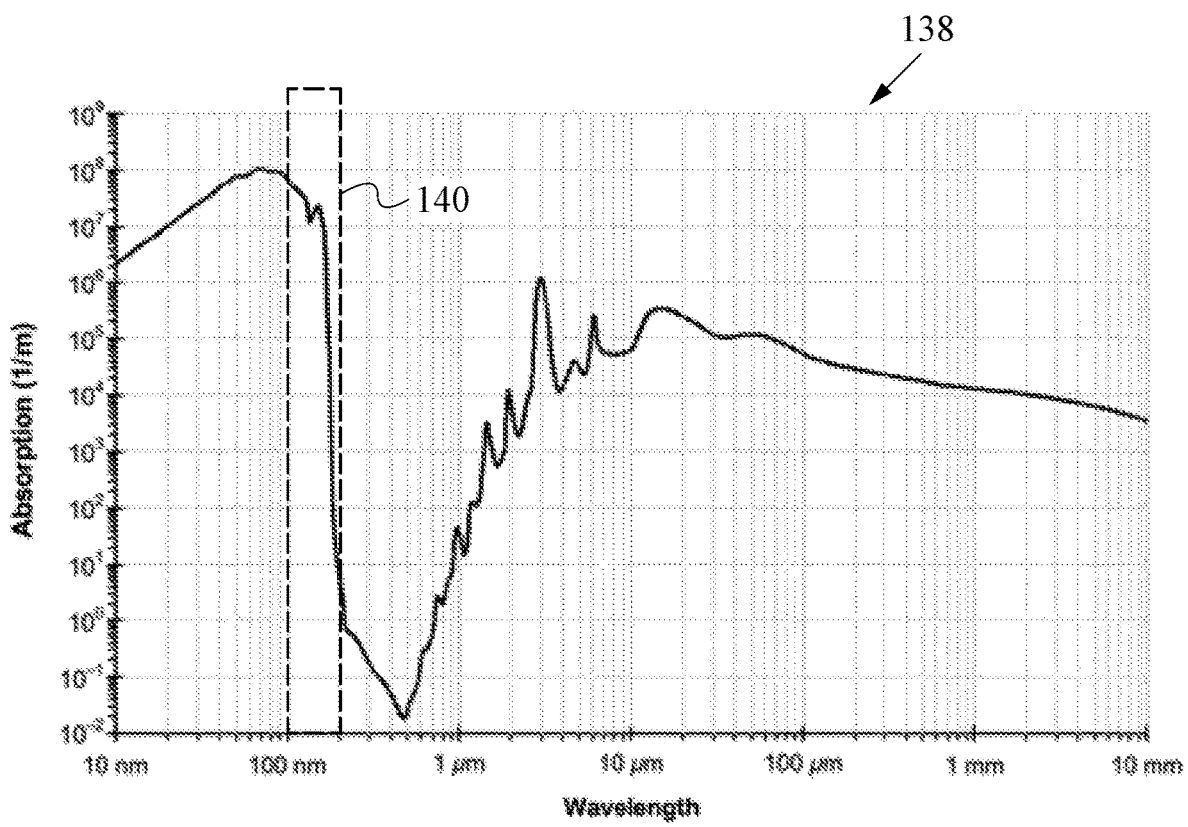

In this embodiment there is no need to use a cryogenic fluid and the complications of holding cryo-EM grid 202 immersed or above the surface of such cryogenic fluid are avoided. Furthermore, as in the case of holding cryo-EM grid 202 above a cryogenic fluid, this embodiment has the advantage of keeping the optical path (not expressly indicated, but see reference 122 to a straight optical path in FIG. 1A) along which inspection light 220' and response light 222' propagate simple and without additional optical effects that need to be mitigated.

Response light 222' leaves the evacuated optical dewar vessel (not shown) through output window 226. A long working distance (LWD) microscope objective 230 is positioned for conditioning response light 222' and passing it to a photo-detector 228. Photo-detector 228 is a light camera that is adapted for imaging response light 222'. In other words, light camera 224 is set up as a microfluoroscope.

In operating the screening tool of invention in the second configuration using the specific elements introduced in this embodiment a number of issues need to be properly addressed. For one, the resolution of microfluoroscope 228 is determined by two factors. The first factor is the diffraction limitation of microscope 228 used to view the luminescent image of cryo-EM grid 202. As with any form of microscopy, this limit ($\sigma$) is determined by the wavelength ($\lambda$) used and numerical aperture (NA) of objective 230, and it is given by the Rayleigh criterion expressed as:

$$\sigma \approx 0.61 \lambda / NA$$

The second factor limiting resolution is Fresnel diffraction of VUV inspection light 220' as it projects across any gap (gap d—not expressly shown in FIG. 6 due to its small size) between ultrathin vitrified water layer 210 holding sample 212 and scintillator 216. This resolution is given by:

$$\sigma \approx (\lambda d)^{1/2}$$

Clearly it is desirable to minimize the gap between cryo-EM grid 202 and scintillator 216 as much as possible. Fortunately, with existing cryo-EM grids, holey film 206 is very close to being flush with one side of grid mesh 204. In the case of monolithic gold grids (UltrAufoil® and Au-flat®), holey film 206 is also very flat. In addition, it is possible to gently place and press grid mesh 204 into direct contact with the material of scintillator 216. Having grid mesh 204 thus gently compressed between flat scintillator 216 and the other flat and thin VUV transmitting wafer formed by transmissive plate 218 is an advantageous approach. Ultimately, it is desirable to keep the gap to close to one micron (1 µm) over much of the surface area of grid mesh 204 provided that the grid surface is free of projections and surface contamination.

When there is excess ice material projecting out from grid mesh 204 on the side scintillator 216, this ice material, which sometimes appears in the form of burr, could act as a spacer. Thus, the side from which water 210 containing sample 212 (again, only 210H and 212H are expressly shown in FIG. 6 for reasons of clarity) is applied to grid mesh 204 during the prior vitrification step before the screening process of invention is pertinent. For instance, there are some blot- free ultrasonic spray methods that have been developed, which are very promising. In these techniques, it would be essential to apply the spray containing sample 212 on the side of holey film 206 that is not flush with the support bars of grid mesh 204. In this case, the excess droplets of material will not act as spacers on the side of grid mesh 204 that needs to be in close proximity to scintillator 216 to maximize resolution. With commonly used blotter methods, methods that minimize excess surface material should be used.

It should also be noted that carbon films, such as Quantifoil®, tend to have significant undulations, making them much less flat than the gold grids. Thus, existing Au grid products are currently more desirable for use with the present invention, in addition to having other advantageous properties. In fact, the need to keep grid mesh 204 in very close proximity to scintillator 216 to preserve high resolution is the largest challenge of microfluoroscopy (second configuration) compared to direct VUV microscopy (first configuration). With much shorter wavelength x-rays more commonly employed with microfluoroscopy, this issue is greatly relaxed.

There is a different potential approach to achieving small gaps between grid mesh 204 and scintillator 216 that doesn't require two opposing plates, with cryo-EM grid 202 sandwiched between them (Fluorotweezers). This approach uses an electrostatic force between grid mesh 204 and scintillator 216 holding them in close contact. A voltage can be applied between grid mesh 204 and the distant side of scintillator 216 to create this clamping force. Since all scintillators are electrical insulators, scintillator 216 acts as the dielectric of a capacitor, and grid mesh 204 as one of the conducting plates. The important takeaway is to provide a very small gap between grid mesh 204 and scintillator 216 to minimize diffractive blurring, and there are multiple means to achieve this.

The embodiment using holding structure 200 with tines 214A, 2143 equipped with scintillator 216 and transmissive plate 218 for pinching cryo-EM grid 202 can also be used in the case where the evacuated optical dewar vessel in which cryo-EM grid 202 is held submerged in a cryogenic medium such as liquid argon. In such arrangement inspection light 220' and response light 222' propagate through liquid argon. Under those conditions, when a 1 μm gap is maintained between grid mesh 204 and scintillator 216 and VUV wavelength of inspection light 220' is 120 nm (that is the wavelength of 157 nm light propagating in liquid argon), Fresnel diffraction will limit the resolution to ≈350 nm.

Figure 3:
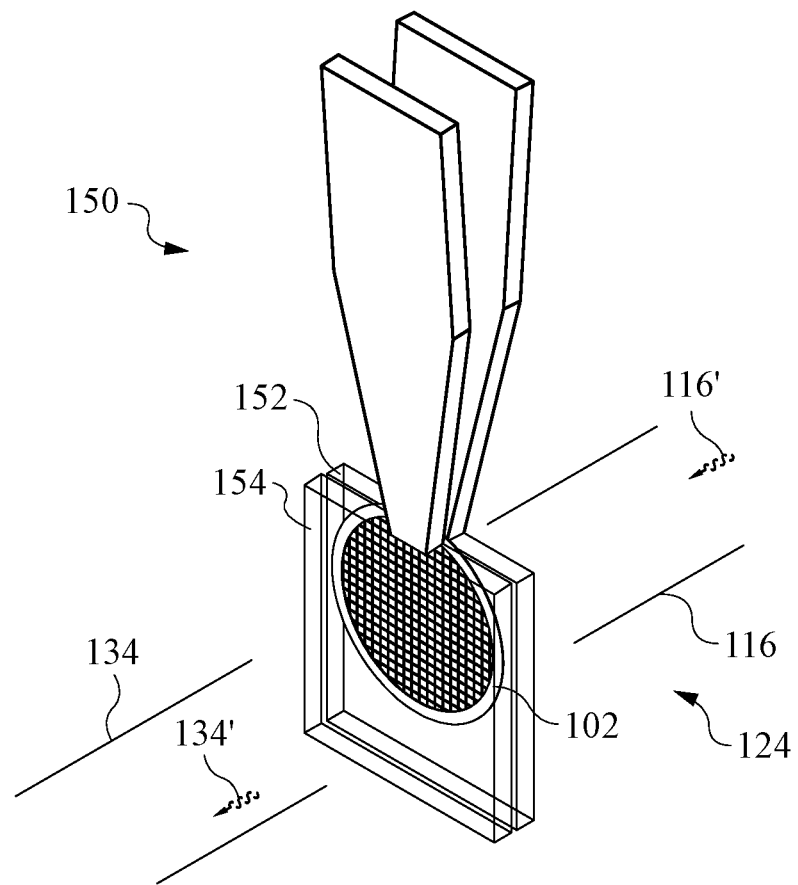
Figure 4:
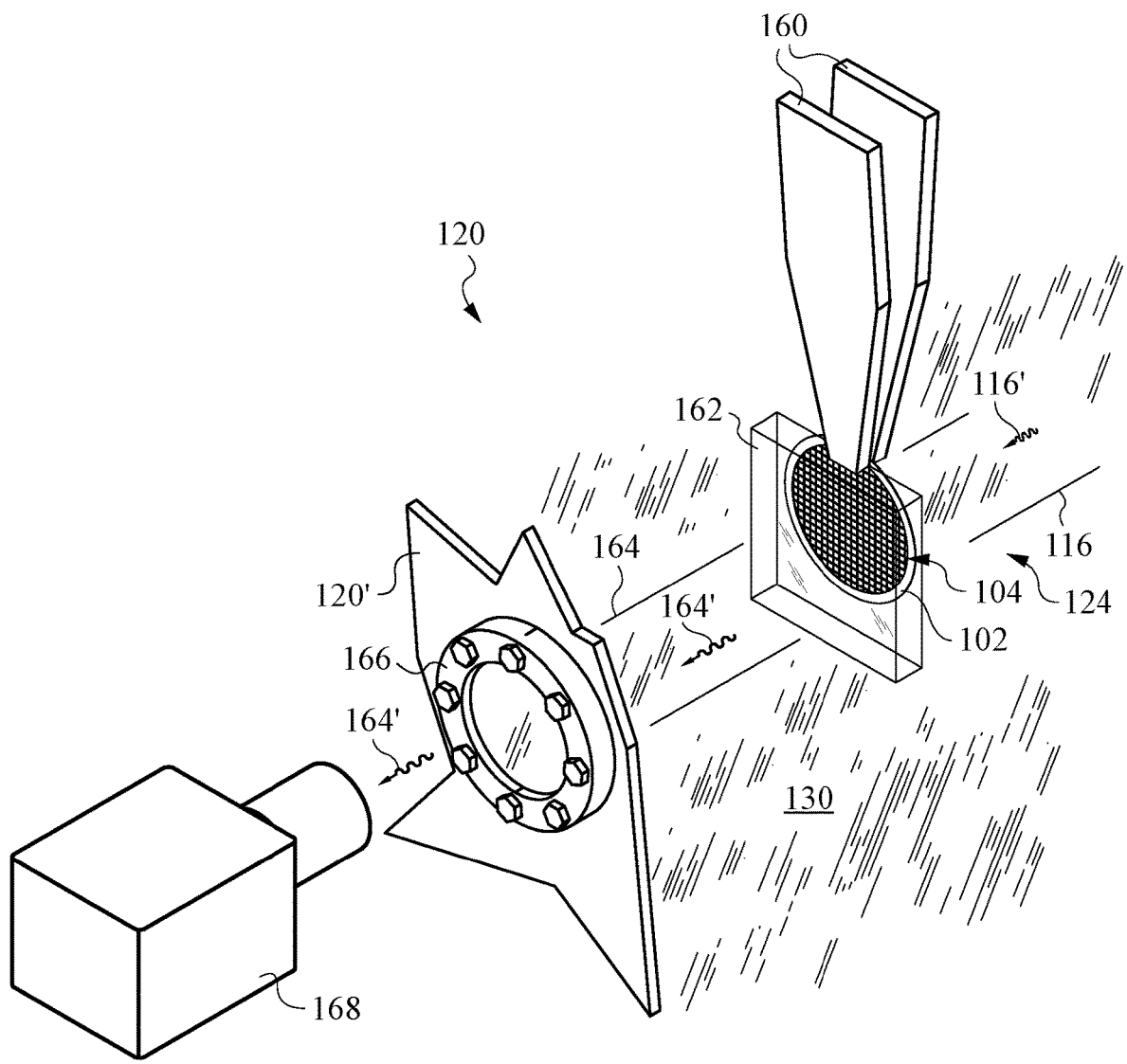

An attractive feature of light in most of the VUV wavelength range (see range 140 in FIG. 3) is that the attenuation length in typical scintillators that can be employed as scintillator 216 is extremely short. Thus, all fluorescence or response light 222' is emitted within the depth of field of microscope objective 230. Advantageously, there is also no significant carrier diffusion at a level that can smear out scintillation light localization if photo-induced carriers diffuse significantly away from their point of origin.

At slightly longer illumination wavelengths such as 193 nm, which is still within UVU range 140 (see FIG. 3) as defined herein, the attenuation length in scintillator 216 may be longer than desirable. This can be addressed by proper selection of the material for scintillator 216. In fact, when operating at these longer illumination wavelengths within the UVU range 140 the selection of scintillator 216 is more of an issue in general then when working with shorter illumination wavelengths. For instance, at 193 nm transmission through YAG:Ce is appreciable, with some observable transmission through 1 mm. This leads to light generation well beyond the depth of field of microscope objective 230. The result is a disturbing out-of-focus haze and higher diffraction blurring. The consequence is lower image contrast and resolution. Fortunately, there are other suitable scintillator materials with higher attenuation at this wavelength. For instance, cerium doped gadolinium aluminum gallium garnet (GAGG:Ce) is another cubic rare-earth scintillator material having very high light output and good mechanical properties. It has been demonstrated to provide higher performance microfluoroscopic imaging than YAG:Ce with 193 nm illumination light due to its smaller bandgap and a resultant much shorter attenuation length at 193 nm of less than μm.

One additional practical matter that exists is fluorescent light from the scintillator 216 reflecting back from grid mesh 204 to objective 230. This can make highly opaque mesh 204 appear to have some transmission of incident inspection light 220'. The problem can be dealt with by simple digital correction using imaging software, as is known to those skilled in the art.

For determining the final resolution from both Fresnel diffraction and the diffraction limit of microscope objective 230, addition in quadrature is required. Using existing 0.5 NA Long Working Distance (LWD) objectives as objective 230 corrected for viewing through VUV input and output windows (only output window 226 shown in FIG. 6), and green scintillator response light 222' near 500 nm, the resolution of microscope 228 will be ≈600 nm. Combined with Fresnel diffraction, observed resolution will be approximately 700 nm. This can be improved using a higher NA objective 230 and/or shorter emission wavelength. For instance, 0.7 NA LWD objective 230 is practical and efficient when using a near-UV scintillator 216 emitting near 370 nm (Ce:YAP). This provides microscope 228 with a resolution of ≈320 nm, and a total resolution of ≈475 nm. Even a 10 μm gap (approximate thickness of grid mesh 204) would easily resolve individual holes 208 and ice thickness or ultrathin vitrified water layer 210 thickness, although detail across individual holes 208 would be lost.

It is further noted that the use two opposing plates either in the form of scintillator 216 and transmissive plate 218 in the second configuration or two transmissive plates in the first configuration is highly advantageous. In addition to keeping grid mesh 204 close to scintillator 216 or another transmissive plate, as the case may be, the plates limit diffractive blurring while simultaneously protecting grid mesh 204 from contamination by condensing ice crystals. Such contamination can be a significant problem when removing cryo-EM grid 202 from grid cryo boxes (not shown) during sample handling procedures.

Figure 7A:
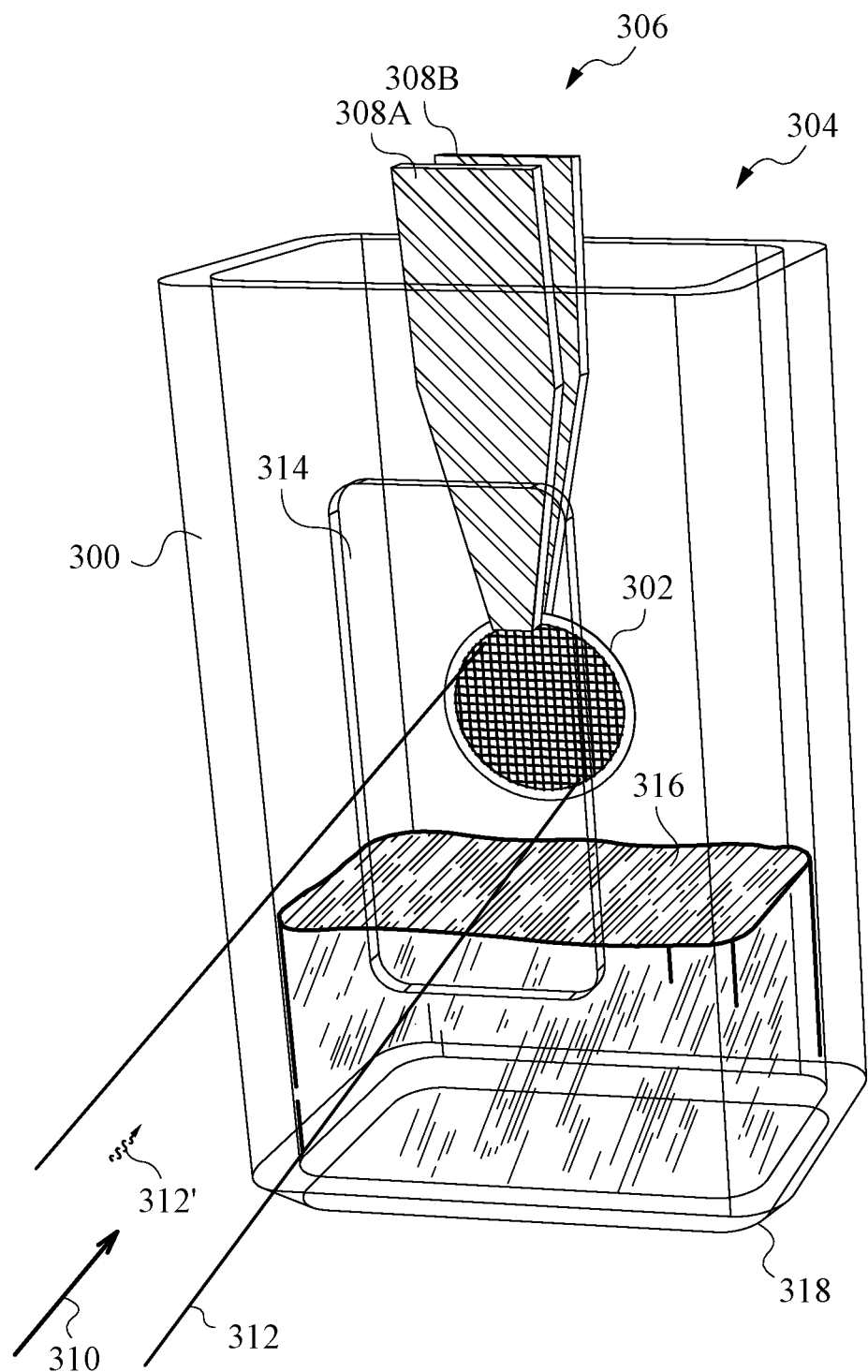

FIG. 7A shows another embodiment of a portion of a screening tool that uses a cuvette 300 in which a cryo-EM grid 302 is held or kept while performing the screening according to the invention. Cuvette 300 has a top opening 304 that is large enough to admit a holding structure 306 that includes gripping tines 308A, 308B that hold or grip cryo-EM grid 302. It is noted that tines 308A, 308B may be further equipped with transmissive plate(s) and/or a scintillator, as in several of the prior embodiments, depending on the configuration of the screening tool. These elements are not shown in FIG. 7A for reasons of clarity.

Cuvette 300 is placed in an evacuated optical dewar vessel (not shown) and in optical path 310 indicated schematically by an arrow of an inspection light beam 312 so as to expose cryo-EM grid 302. In order to efficiently pass inspection light beam 312 at the VUV wavelength chosen, cuvette 300 needs to admit inspection light 312' shown by a schematic photon with minimal attenuation. Since a typical case cuvette 300 is made of fused silica it needs additional features to combat attenuation of inspection light 312'. For this reason, cuvette 300 has a thinned-out window 314 for admitting inspection light 312' therethrough.

Cuvette 300 has a wall thickness of about 2.5 mm. Window 314, on the other hand, has a thickness of between 1 mm and 2 mm and preferably about 1.25 mm. Thus, when inspection light 312' has a VUV wavelength of 157 nm and hence suffers significant attenuation while propagating through fused silica it is critical that this thickness be achieved across window 314. Of course, one can use a different more VUV adapted material for making cuvette 300 such as $CaF_2$ or $MgF_2$. However, these materials and others that afford low attenuation of VUV wavelengths tend to be mechanically brittle, experience stress and shatter when placed in cryogenic environments. Therefore, working with cuvette 300 made of fused silica is convenient and often preferred in the context of the present invention. It should be further noted that this does not rule out the use of small fluoride-based crystal windows in cuvette 300. However, proper methods for dealing with the structure of cuvette 300 need to be implemented when using such windows.

Figure 7B:
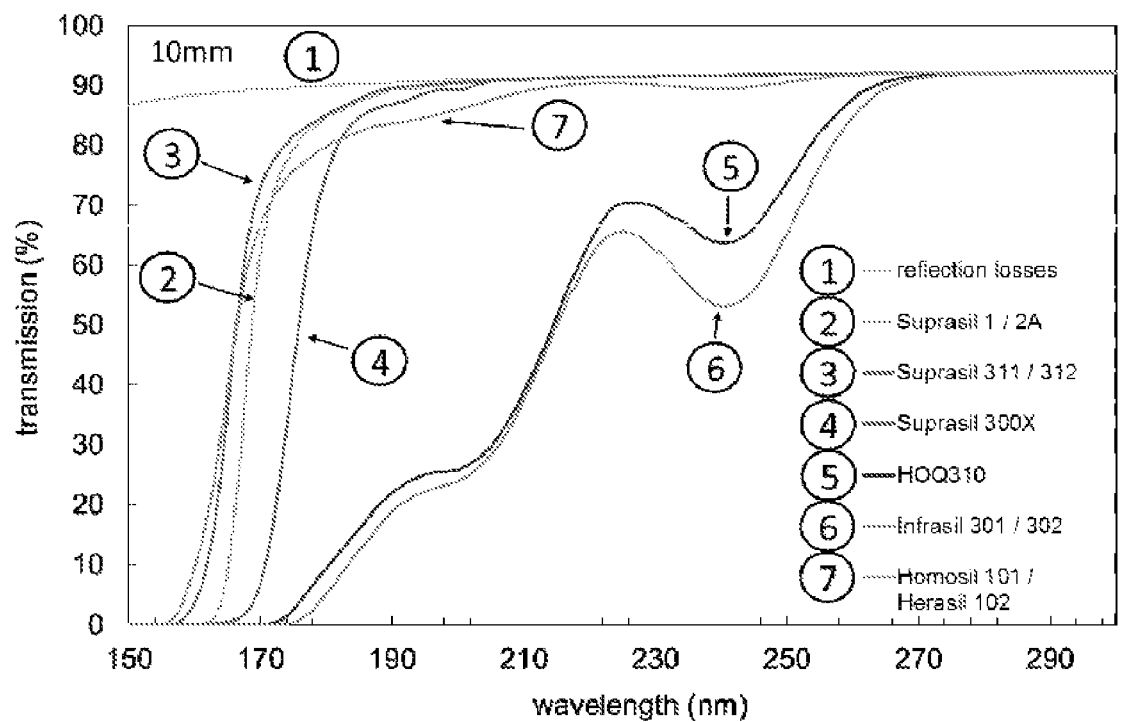

FIG. 7B shows the transmission curves for various grades of fused silica as provided by Heraeus (Nurnberg F. et al., "Bulk damage and absorption in fused silica due to high-power laser applications", Proc. of SPIE, Vol. 9632, Nov. 2015) for a 10 mm thick wall. It is clear from this figure that window 314 needs to be thin to permit transmission of light at 157 nm, as discussed above. It should further be noted that fused silica transmission drop-off near the cutoff is highly dependent on the level of trace impurities—most notably hydroxyl ions and chlorine.

Returning to FIG. 7A we note that given the optical and material constraints, cuvette 300 is adapted for use with a 1 atmosphere internal pressure and is further designed for holding a cryogenic medium 316. In the present case cryogenic medium 316 is liquid nitrogen residing in the bottom portion of cuvette 300. Cryo-EM grid 302 is held above the level of liquid nitrogen 316 in order to maintain it in the cold gas phase of nitrogen and thereby ensure proper cryogenic environment for screening.

It should also be noted that standard cuvettes have diffusion bonded right-angle corners. Such corners tend to crack from stress concentration when cryogenically cooled. For the purposes of the present invention flame-rounded corners, see e.g., corner 318, and special reinforcing materials are used. One such reinforcing material successfully used is the epoxy based composite material Loctite EA 1C, also known as Hysol. This material is known as also having excellent properties for vacuum use. Advantageous dimensions for cuvette 300 for use in the present invention are 12.5 mm by 12.5 mm outside and 10.0 mm by 10.0 mm inside. The thickness of window 314 is 1.25 mm. The height of currently used cuvette 300 is 90 mm but longer custom cuvettes and many other cuvette designs can also be used.

Figure 7C:
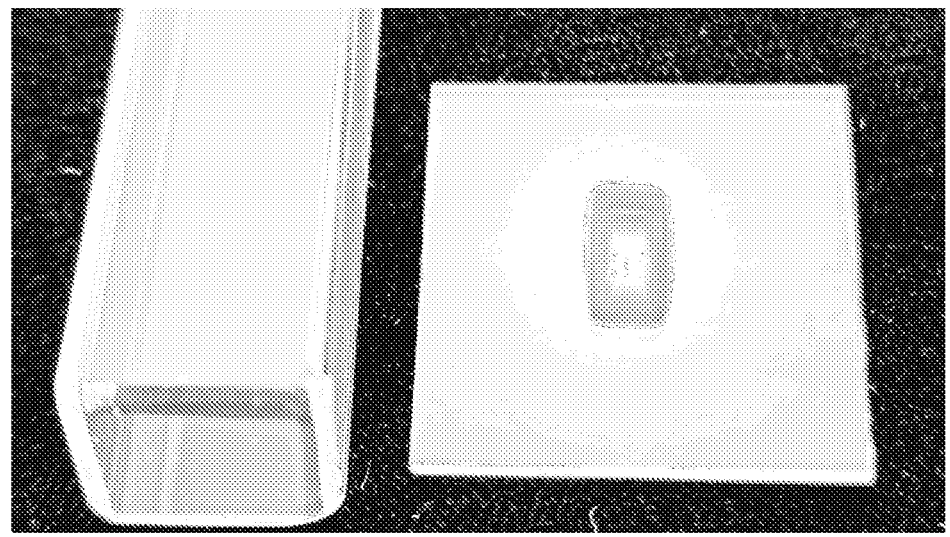

FIG. 7C illustrates an advantageously produced window 314. In this case window 314 was produced by a "dimple grinder" tool. More precisely still, window 314 as shown in this image is a 1 mm wide slotted window polished into the wall of fused silica cuvette 300.

Cuvette 300 can be used in many embodiments set up for either the first or the second configuration of the screening tool. Although in the example of FIG. 7A cuvette 300 only contains cryogenic medium 316 at the bottom, it could also be filled liquid nitrogen or other cryogenic medium and hold cryo-EM grid 302 submerged in it. Of course, additional optical adjustments need to be made in those cases as well known to those skilled in the art and also addressed above, e.g., compensation for interfaces and materials in optical path 310.

Figure 8:
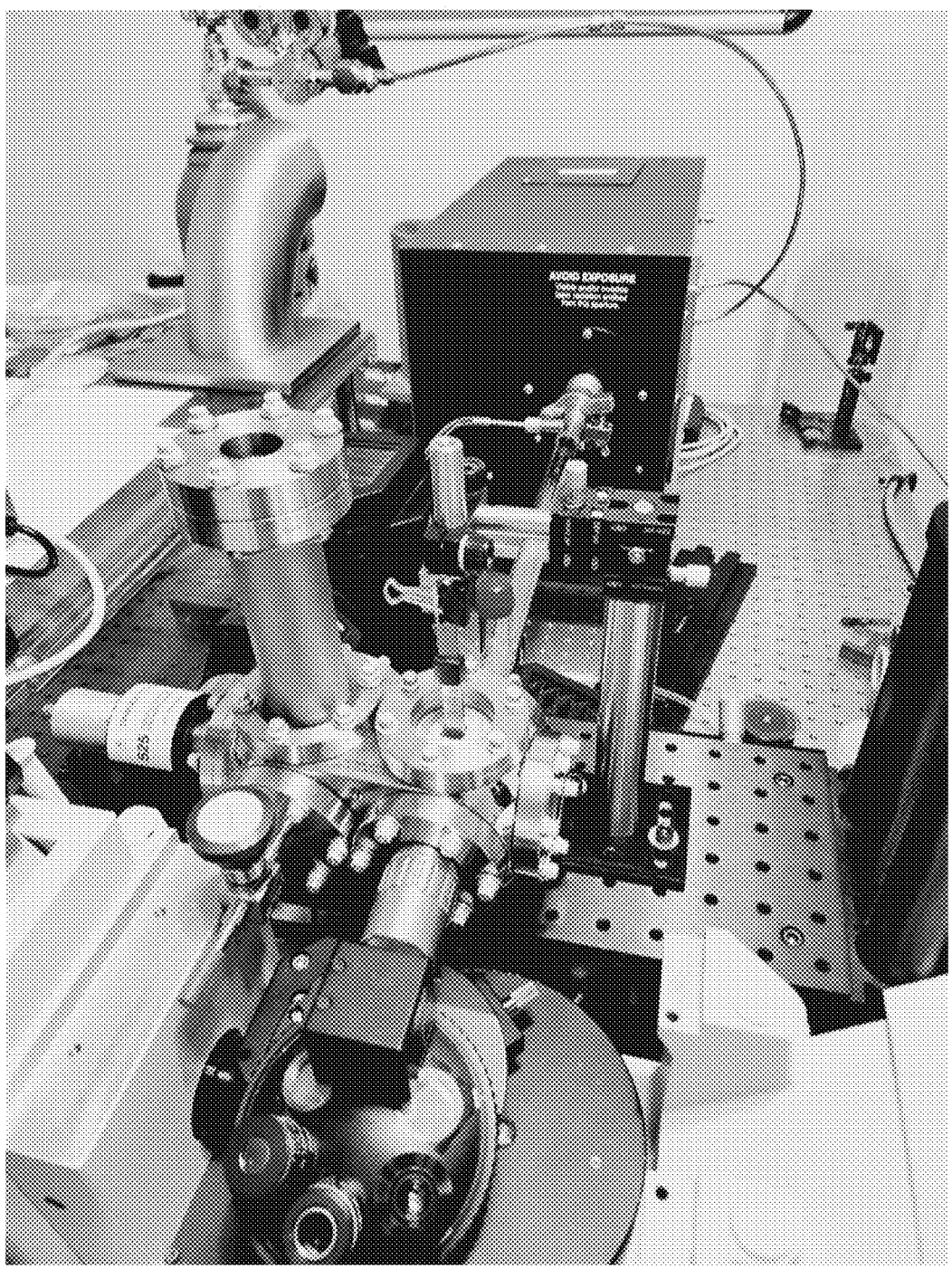

FIG. 8 shows a photograph of a prototype grid inspection system of the invention employing the second (microfluoroscopy) method. The "fluorotweezers" can be seen entering the fused silica cuvette on the top of the sealed off stainless steel vacuum dewar chamber. A LN cold finger used to trap residual water vapor in the chamber is next to the cuvette. The long working distance objective of the microscope is inserted into a reentrant viewport. This objective is optically corrected for viewing the scintillator through the 3.5 mm of glass comprising the viewport and the cuvette. The mini excimer laser with nitrogen purged beam tube is visible in the rear. This light enters the vacuum through a $MgF_2$ window, and is directed to the cryogenic fused silica cuvette.

Figure 5A:
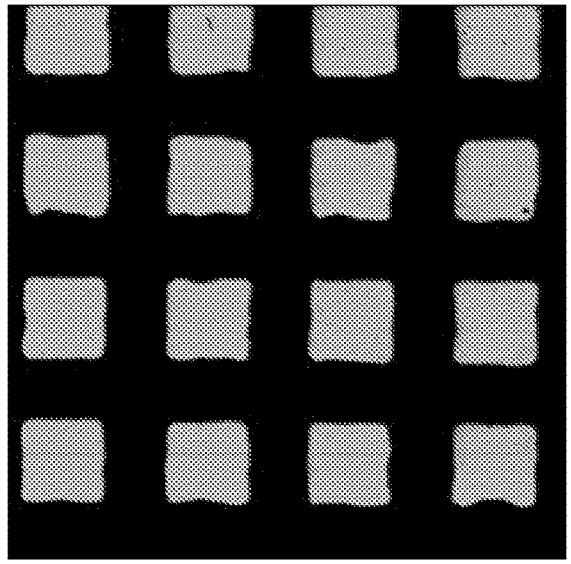
FIG. 5F is a microfluoroscopic image of the Au-Flat grid of FIG. 5E taken in a preliminary test with thin unvitrified ice present. Clearly seen are central areas of thinner ice on individual coarse mesh openings.
FIG. 5G is a close up microfluoroscopic image of the Au-Flat grid of FIG. 5F showing another thin center region. The center region is seen to be surrounded by thicker ice.
Figure 5B:
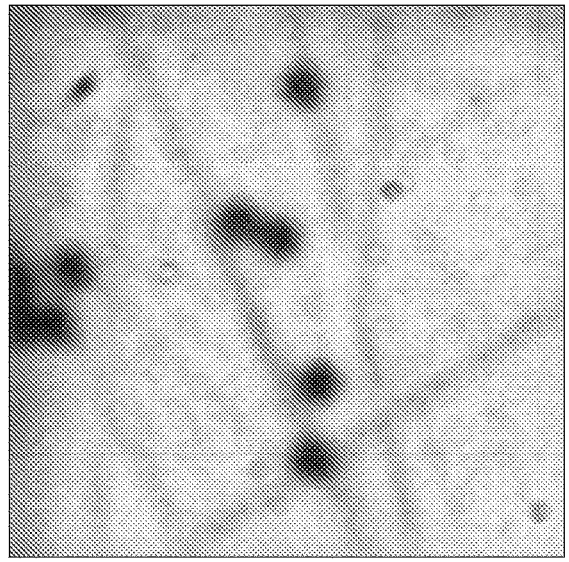
Figure 5C:
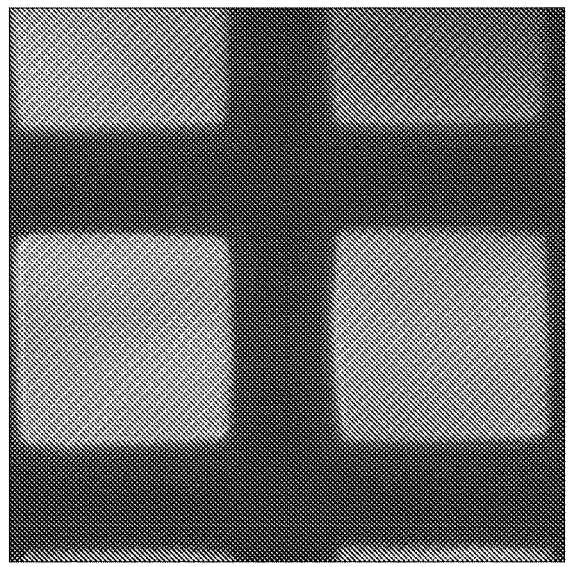
Figure 5D:
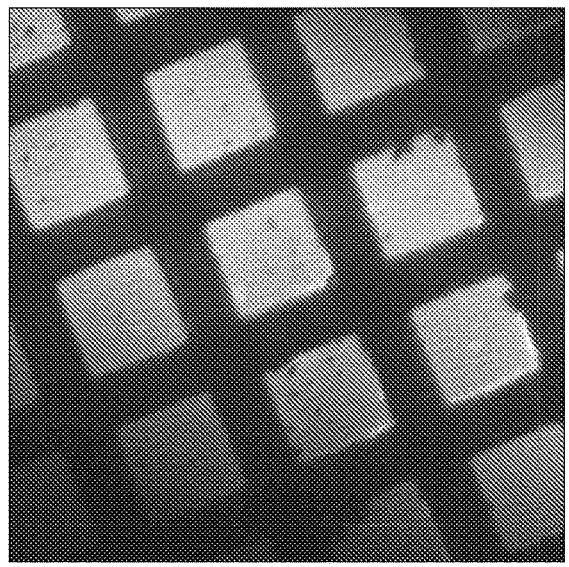
Figure 5E:
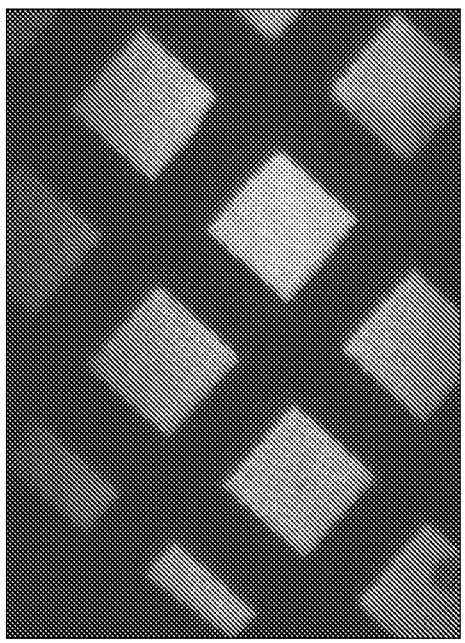
Figure 5F:
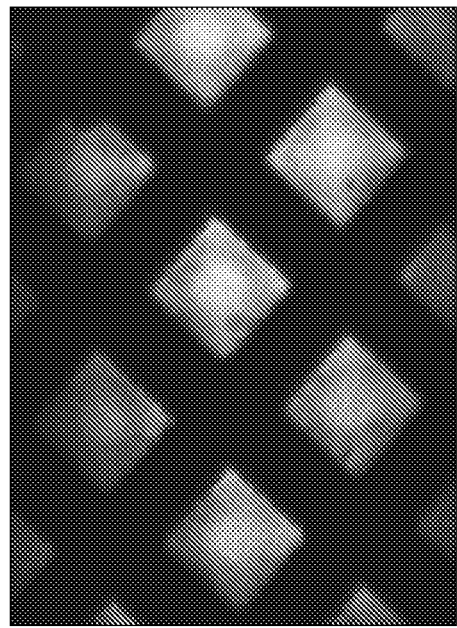
Figure 5G:
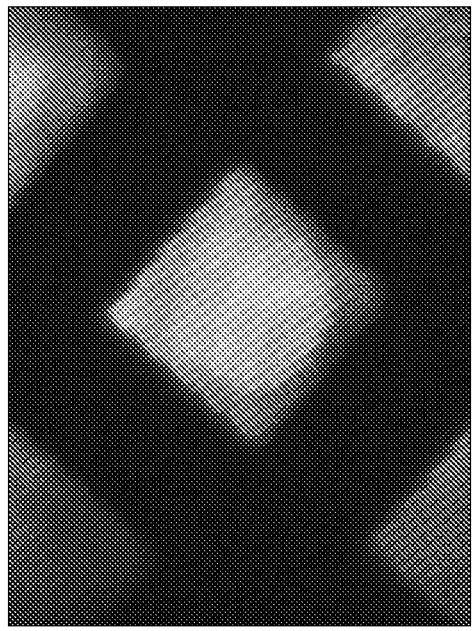

It should be appreciated that the previous descriptions of the invention have discussed a system where the sample grid is held in a vertical orientation and the incoming VUV light and outgoing imaging light are oriented in a horizontal axis. However, it is also possible to have a vertically orientated system, where the grid is held horizontally, and the light path is vertical. Indeed, this was the arrangement used for producing the images of FIGS. 5C and 5D. In this case the laser light is directed downward into the dewar vessel, without the need of any vacuum windows. The microscope used is a standard inverted design, with the scintillator view from the bottom of the dewar vessel. The advantage of this arrangement is the lack of any entrance windows, which permits shorter wavelength VUV illumination to be used, where fused silica is too absorbing. Thus, very short wavelength VUV radiation could be employed in this configuration. However, it is significantly more complicated to design a mechanical holding device to insert and rotate the grid into the horizontal orientation. In addition, the incoming VUV light would have to pass through a fairly thick layer cryogenic liquid, which can easily become contaminated with highly absorbing oxygen from condensation from the atmosphere. Here, the gaseous cryostream embodiment would be advantageous. Whether a horizontal, vertical, or even hybrid configuration of the screening tool is used, the same concepts of this invention are encompassed in this specification.

In practicing the methods of invention in either the first or second configuration of the screening tool the above-described embodiments of systems, parts and elements can be deployed interchangeably and further adjusted. Among other, additional optical elements and techniques can be used in the optics portion to increase resolution and to collect more information about the vitrified water layer and the sample.

Without adapting the optics the lateral resolution of grid images can approach 500 nm. However, it can be brought to near 100 nm employing additional optical adjustments and elements in accordance with the present invention. Therefore, the response light contains information about both the sample and the ultrathin vitrified water layer. Depending on the VUV wavelength chosen, the response light contains information about at least one physical parameter of the water layer or of the sample or even both.

At 500 nm resolution holes in the single micron range are clearly observable, with information regarding ice thickness or vitrified layer thickness variation across individual holes available. Information about average particle size of the sample as well as large aggregation is also accessible in some cases.

Obviously, 500 nm resolution is insufficient for viewing individual particles of the sample to identify non-uniform distribution, non-random orientation, nanoscale aggregation, and other detrimental issues normally identified using TEM screening. However, by reducing time intervals between the application of the sample to grid and subsequent vitrification, along with improved grid structures, such problematic issues may be largely ameliorated in the future. Reducing interaction time at the air-water-interface should be particularly helpful with the serious issue of protein denaturation when the sample includes protein. At the same time, if vitrification delay is reduced into the low-millisecond range, reliable sample production may become more challenging due to exacting conditions required to achieve high yield. Thus, vitrified layer or ice thickness screening using the present invention is useful for rapidly identifying usable grids. The tool can also be used for the general development of improved vitrification techniques.

Exemplary physical parameter of the sample that is of interest is the concentration of suspended particles of interest in the ultrathin vitrified water layer. Sample parameters such as average particle concentration as well as sample aggregation are of interest in the present screening method as well. Knowledge of this at least one physical parameter of either the sample or the water layer or both permits the screening tool to rapidly determine the suitability of the cryo-EM grid for further processing. Further, this knowledge also allows for fine-tuning of parameters to make good samples and vitrified water layers. This is especially advantageous if the present rapid screening tool is integrated or works in tandem with a vitrification system. The resolution of this VUV screening device is clearly much lower than screening with electron microscopy. Thus, it will decrease but not completely eliminate the number of grids that need be screened using costly and time-consuming electron microscopy.

The embodiments described above work with a standard dry objective to image the object or scintillator. It should be noted, however, that oil or water immersion-objectives, which permit NA>1 are commonly employed to achieve better resolution in light microscopy practiced in the second configuration of the screening tool. Obviously, standard immersion objectives operating with such media between the object and the objective are not usable for this application. Immersion objectives operating in cryogenic fluids are also largely impractical although an all-reflective objective immersed in LN might conceivably be possible. However, there is also the concept of the "solid immersion lens" (SIL), which does not require an immersion fluid. In the simplest configuration, a SIL is simply a highly perfect hemisphere, with a flat bottom. Objects located right on the flat surface of a hemispherical SIL are observed through the curved surface using a standard light microscope. For a point located directly at the center of the SIL flat surface, rays of divergent light are not refracted at the curved surface. Moreover, a larger region near the center can also be viewed without significant distortion by refraction, allowing a limited circular region to be observed without significant aberration.

The resolution of a light microscope using a hemispherical SIL is improved over that of the dry objective simply by the value of the refractive index of the SIL. Thus, a SIL with a refractive index (RI) of 2.0 would permit double the resolving power of the dry objective used. Long working distance (LWD) objectives are used, due to the extra distance imposed by the SIL. Even higher resolution could be obtained with more refractive materials like diamond (RI=2.4), which has been used to manufacture SIL elements of very high refractive index. Diamond can also transmit into the deep UV range. One simple way to view the effect of using a SIL is to consider the wavelength of the light as being reduced in proportion to the refractive index of the SIL material, just as in standard oil immersion objectives. At the same time, the spherical SIL surface prevents higher angle rays from being lost by total internal reflection at the SIL surface—unlike a flat coverslip. For microfluorocopy practiced in the second configuration, a thin scintillator layer can be attached to the SIL flat. More simply, the SIL itself can be fabricated from a scintillator material. As with flat scintillators, cubic materials like the various garnet scintillators are preferred due to their lack of birefringence. Clearly amorphous (glassy) materials also possess this desirable feature.

There is another version of the SIL known as a "SuperSIL" (also called a Weierstrass or aplanatic SIL), which is fabricated with a thickness greater than a hemispherical SIL. This results in surface refraction of the object's light rays into a narrower light cone. Therefore, when using a SuperSIL, all of the high-NA light cone can be collected with an objective having an NA significantly less than 1. However, the SuperSIL exhibits chromatic aberration if non-monochromatic light is being observed, as design thickness is dependent on $\lambda$. Because scintillators have a relatively broad emission spectrum, a filter would have to be employed with a SuperSIL for microfluoroscopy. This would reduce the efficiency of the system, and require more VUV illumination, and attendant radiation dose to the sample. Of course, with VUV microscopy, the source can be much more monochromatic—especially if it is a laser.

It should be noted that SIL optical elements can be fabricated with facets on the flat, so that only a small central area truncating the facets exists at the center and projects outward from the SIL. This is helpful for positioning a SIL to an object and assuring there is close contact with the surface, even if the object is not completely flat. As previously noted, for microfluoroscopy practiced in the second configuration of the screening tool of invention, making good contact is important to reduce Fresnel diffraction.

In addition to SIL optics, one can use a microsphere to attain super-resolution imaging. A microsphere in contact with an object can deliver images that show higher resolution than the normal Abbe Limit predicts (super resolution). An optical device that delivers such performance is sometimes referred to as a "superlens", and is the subject of current research with metamaterials. Test objects have been observed in multiple investigations at a resolution well below the Abbe Limit, which is of most relevance for the purposes of the present invention. Spatial resolution near 50 nm can be achieved with visible light.

It should be appreciated that since the luminescence in microfluoroscopy originates directly on the microsphere surface, there is no issue with the object distance being too distant from the microsphere to achieve super resolution imaging. The effective object (luminescent shadow) is in fact located on the microsphere surface. In the case of evanescent waves, any small gap would prevent this information from transferring from the object to the microsphere. It is also worth noting that the microsphere is also ideal for achieving close contact with the grid. Means to mount microspheres to fine positioning stalks have been devised for achieving localized imaging by scanning the sphere to an area of interest.

For this invention, microspheres of a scintillator material can be used in the same manner as flat or SIL scintillators. Examples of materials that have been the most successful for demonstrating this method include several different tungstate materials; with the well-known cadmium tungstate scintillator giving very high resolution/super-resolution imaging. Once method to create such microspheres is by passing powdered material through a gas flame. However, this approach only works successfully for certain materials, as many initially efficient scintillators lose their luminescent properties during such treatment. For VUV microscopy, a non-scintillator microsphere sufficiently transparent to the VUV light could be used to achieve higher resolution than a SIL. Due to the small diameter of microspheres, somewhat attenuating material could still be acceptable for microscopy.

The methods of invention can be further adapted to operating the source at two VUV wavelengths to obtain information about ultrathin vitrified water layer and sample in the same configuration. For example, it has been demonstrated during this work when using an excimer laser with the molecular fluorine laser line as the source to generate inspection light at the 157 nm VUV wavelength, argon can be added to the standard $F_2$ laser premix to generate limited 193 nm laser light simultaneously. Thus, inspection light at VUV wavelength of 193 nm (ArF) can be produced by the laser without having to change gas mixtures each time the desired wavelength is changed. Such change would be very inconvenient, time consuming and costly. Filters or other optical elements such as a prism can be used to separate the two wavelengths. The ArF emission is much weaker than standard ArF lasers with this dual wavelength operation. In addition to the collimated laser light, the laser's 193 nm output contains significant amounts of more divergent amplified spontaneous emission (ASE). However, this 193 nm emission is adequate for independent absorption measurements for samples made up of protein, where attenuation of water is insignificant. As previously noted, proper selection of scintillator material is important for achieving high resolution and contrast at the longer wavelengths due to the attenuation length of photons in the scintillator layer being higher than optimal in some commonly used materials.

In addition to imaging the organic sample component in ice layers or ultrathin vitrified layers by absorption at longer wavelengths where water is essentially transparent, other more conventional means of achieving this are also possible options. This can be enabled using well-known microscopy techniques such as dark field illumination, fluorescence microscopy or other techniques that achieve adequate contrast from samples having low absorption contrast with simple bright-field illumination. In the case of fluorescence microscopy, this could include the incorporation of fluorophores in the sample, or preferably using autofluorescence of sample components themselves, e.g., in samples that contain protein molecules. These methods are also applicable with the use of SIL and microsphere optics as previously discussed for VUV sample imaging.

There are still other possible VUV sources that can be used in the screening systems of the present invention. One alternative are excimer lamps, which emit a relatively narrow band of radiation in the VUV wavelength at 172 nm ($Xe_2$), 147 nm ($Kr_2$), and 126 nm ($Ar_2$). Excimer lamps can also be used as they have an extremely high conversion efficiency of power to light of ≈40%. The $Xe_2$ excimer band, however, has a relatively long attenuation length in water (≈7 μm) and thus may not be well-suited for screening the thickness and thickness variation of the ultrathin vitrified water layer. However, it may be used for measuring average particle concentration of the sample held in the vitrified water layer or ice. The other excimer lines exhibit high water absorption characteristics, but do require the use of the windowless illumination embodiments, such as the vertically configured system previously described. Although relatively narrowband (around 10 nm FWHM), the bandwidth of excimer lamps is less desirable than the highly monochromatic emission from $F_2$ lasers.

Because of the varying attenuation at different wavelengths within the emission curve, accurate measurements of ice thickness are more complicated. Thus, a monochromator may be required. The lack of collimation of the emitted light is also not ideal. Although standard excimer lamps are very efficient and can emit very high total power, they are not very bright due to a large source size (many $cm^2$). Excimer lamps most commonly use a dielectric barrier discharge (DBD). However, there are commercially available excimer lamps that are much brighter than DBD lamps, which employ a focused electron beam to excite the gas (http://excitech.de/elux/). The e-beam passes from the electron gun vacuum into a gas cell through a thin silicon nitride window. These lamps have a source size of about 1 mm, which permits the divergent emission to be collected and refocused onto the grids very efficiently. They do have a cost similar to an excimer laser, and are significantly more expensive than DBD lamps. Thus, a selection between an $F_2$ laser and an e-beam pumped excimer lamp would require a cost/performance analysis to determine which would be a better choice given the exact parameters of the vitrified water layer or ice and the sample.

$Kr_2$ or $Ar_2$ excimer laser could potentially also be an ideal light source for the screening tool of this invention. In fact, the very first excimer laser ever demonstrated operated with Xe dimers (however, it was a very large electron beam pumped installation). Unfortunately, small and low-cost excimer lasers using noble-gas dimers pumped with an electrical discharge have proven difficult to realize. However, a relatively small $Kr_2$ dimer lasing at 146 nm has been demonstrated, which could become of potential use for this invention with further development.

Small and relatively inexpensive metal vapor lasers that operate in a hollow-cathode discharge configuration have been commercially produced. The two most common ones are the He—Ag laser (224.3 nm) and the Ne—Cu laser (248.6 nm). The 224.3 nm laser could potentially be used for measurements of protein concentration, but it is not useful for measurements involving water absorption. However, there are some possible VUV laser lines that may be achievable for this type of laser, which have not yet been demonstrated, but are believed to be achievable if low-loss VUV mirrors are employed for the laser cavity.

Another possible source is the deuterium lamp (D2 lamp), which emits a continuum spectrum throughout the whole UV range, including intense emission in the VUV range. These lamps are very commonly used for spectroscopy instruments. This wide-band source requires the use of a monochromator. Efficient optics are required to collect and refocus divergent light onto the sample, in the same way as excimer lamps. D2 lamps are economical, widely available, and simple and reliable to operate. The source size is about 1 mm, which is similar to costlier e-beam pumped excimer lamps. Thus, they can be deployed in the present screening tool.

It is crucial that vitrified samples remain below the devitrification temperature at all times to prevent damage due to crystal growth in the ice layer (ultrathin vitrified water layer). Ideally, heat input from illumination light should not raise the freestanding ice layer (ultrathin vitrified water layer) by more than ≈10° K. As discussed above, the grid is either immersed in liquid nitrogen (LN) or liquid argon, or else it is held in nitrogen gas near 77° K. Clearly, having the grid in LN is a more efficient heat sink, so the more stringent question is whether nitrogen gas can conduct input power away efficiently enough. Those skilled in the art will not find it surprising that a CW (continuous wave) source is the optimal means to reduce heating with constant average power. If a pulsed source is used, it is better to use the highest repetition rate and lowest pulse energy possible to achieve the same average power. Otherwise, the pulse energy may exceed the heat capacity limitations of the thin ice layer (ultrathin vitrified water layer). In the high frequency limit, a pulsed source essentially becomes identical to a CW source. Calculations show that temperature rise can be maintained to within the acceptable level with average input near 1 mW/mm$^2$. This is at least ten times higher than what is necessary for imaging at acceptable signal-to-noise at reasonable speed. It should also be mentioned that the microfluoroscopy configuration has the advantage of having a large heat sink from the adjacent scintillator being in contact or near contact with the sample. This is optimal for dealing with potential heating issues.

As pointed out above, since VUV light is ionizing radiation, radiation damage must also be considered. Clearly the approximate 8 eV photon energy of illumination light is orders of magnitude less than the electrons used for screening. Still, the total absorbed energy dose is the most important parameter to consider. Detection of any noticeable radiation damage from the screening tool of the invention will be apparent using EM. Calculations and experimental observations of required flux indicate that this should not be an issue at the standard resolution. However, when obtaining high resolution data of individual holes with good signal-to-noise this might become noticeable. If so, then one solution is to simply not use cryo-EM data from the limited holes that were imaged with high dosage.

The screening methods of invention can be applied to cryo-EM grids intended for various forms of cryo-EM examination and study. Specifically, cryo-EM is actually a microimaging suite of several different techniques that are directed at different types of samples. The main cryo-EM technique is Single Particle Analysis (SPA) and it is the one disclosed in the above embodiments. However, there are other cryo-EM techniques including Microcrystal Electron Diffraction (MicroED) and cryo-electron Tomography (cryo-ET). While SPA is the main technique having been considered for screening grids that have samples comprising individual molecules and complexes, the methods of invention can also be deployed for screening grids having frozen microcrystals representing the sample. MicroED is an exciting emerging technique, as it is obviously much easier to grow tiny sub-micron crystals that can be studied by electron diffraction compared to the much larger crystals needed for x-ray diffraction analysis. It is somewhat complementary to SPA, as smaller molecules are better suited for MicroED, while larger molecules and complexes are best suited for SPA. MicroED is more forgiving with ice layer thickness than SPA, but the sample is held in cryo-EM grids that are often identical to those described above. Thus, the screening of ice quality using VUV illumination with SPA as previously discussed is also pertinent for MicroED investigations.

Cryo-ET is an increasingly popular form of cryo-EM. It usually examines somewhat thicker samples (up to ≈500 nm) than SPA. Typically, thin lamellas are generated from regions of interest within whole frozen cells using sophisticated cryogenic focused-ion-beam (cryo-FIB) instrumentation. Examination of these finely machined lamellas for quality control using the screening tool of invention would be especially convenient using longer wavelengths such as 193 nm, where the water content of the sample is relatively transparent. Thus, sample contrast is achieved primarily from the absorption of inspection light by the organic cellular components in the cryo-FIB machined lamellas.

In view of the above teaching, a person skilled in the art will recognize that the methods of the present invention can be embodied in many different ways in addition to those described without departing from the principles of the invention. Therefore, the scope of the invention should be judged in view of the appended claims and their legal equivalents.

What is claimed is:

1. A screening tool for a cryogenic electron microscopy grid that holds a sample in an ultrathin vitrified water layer, said screening tool comprising:
   a) a source for producing an inspection light beam at a vacuum-ultra-violet (VUV) wavelength;
   b) an evacuated optical dewar vessel having a VUV input window for admitting said inspection light beam along an optical path defined within said evacuated optical dewar vessel;
   c) a cryogen source for maintaining a predetermined temperature within said evacuated optical dewar vessel;
   d) a holding structure for holding said cryogenic electron microscopy grid in said optical path to expose said sample in said ultrathin vitrified water layer to said inspection light beam such as to produce a response light;
   e) a light-detector for detecting said response light;
   wherein said inspection light beam experiences attenuation when passing through said sample in said ultrathin vitrified water layer such that said response light contains information about a physical parameter of at least one of said ultrathin vitrified water layer and of said sample thereby permitting said screening tool to rapidly determine suitability of said cryogenic electron microscopy grid for further electron microscopy analysis.

2. The screening tool of claim 1, wherein said light-detector is a VUV microscope and said evacuated optical dewar vessel has a VUV output window for passing said response light to said VUV microscope.

3. The screening tool of claim 1, further comprising a scintillator proximate said cryogenic electron microscopy grid for converting said response light to a longer wavelength response light.

4. The screening tool of claim 1, wherein said cryogen source comprises a cryogenic medium selected from the group consisting of a cold gas and a fluid.

5. The screening tool of claim 1, wherein said holding structure comprises at least one transmissive plate in said optical path positioned proximate said cryogenic electron microscopy grid.

6. The screening tool of claim 1, wherein said holding structure comprises tweezers.

7. The screening tool of claim 1, wherein said physical parameter of said ultrathin vitrified water layer is selected from the group consisting of thickness, and uniformity and proportion of holes in said cryogenic electron microscopy grid comprising said ultrathin vitrified water layer.

8. The screening tool of claim 1, wherein said physical parameter of said sample is a concentration of suspended particles of interest in said ultrathin vitrified water layer.

9. The screening tool of claim 1, further comprising a cuvette for holding said cryogenic electron microscopy grid in said evacuated optical dewar vessel and in said optical path.

10. The screening tool of claim 1, wherein said source is selected from the group consisting of excimer lasers, hollow cathode metal vapor lasers, excimer lamps, deuterium lamps, or high harmonic laser lines.

11. The screening tool of claim 4, wherein said cryogen medium is a cold gas and said cryogen source comprises a jet for directing a cryostream of said cold gas at said cryogenic electron microscopy grid.

12. The screening tool of claim 4, wherein said cryogen medium is a fluid and said cryogenic electron microscopy grid is maintained above said fluid.

13. The screening tool of claim 4, wherein said cryogen medium is a fluid and said cryogenic electron microscopy grid is maintained in said fluid.

14. The screening tool of claim 9, wherein said cuvette comprises fused silica and has a thinned-out window for admitting said inspection light beam.

15. The screening tool of claim 9, wherein said cuvette contains a cryogenic medium.

16. A method for screening a cryogenic electron microscopy grid that holds a sample in an ultrathin vitrified water layer, said method comprising:
a) delivering an inspection light beam at a vacuum-ultraviolet (VUV) wavelength from a source;
b) admitting said inspection light beam through a VUV input window into an evacuated optical dewar vessel along an optical path;
c) maintaining a predetermined temperature within said evacuated optical dewar vessel;
d) holding said cryogenic electron microscopy grid in said optical path to expose said sample in said ultrathin vitrified water layer to said inspection light beam such as to produce a response light;
e) detecting said response light with a light-detector;
wherein said inspection light beam experiences attenuation when passing through said sample in said ultrathin vitrified water layer such that said response light contains information about a physical parameter of at least one of said ultrathin vitrified water layer and of said sample thereby permitting to screen said cryogenic electron microscopy grid to determine suitability for further electron microscopy analysis.

17. The method of claim 16, further comprising providing a VUV output window in said evacuated optical dewar vessel for passing said response light to said light-detector.

18. The method of claim 16, further comprising converting said response light to a longer wavelength response light with a scintillator positioned proximate said cryogenic electron microscopy grid.

19. The method of claim 16, wherein said physical parameter of said ultrathin vitrified water layer is selected from the group consisting of thickness, and uniformity and proportion of holes in said cryogenic electron microscopy grid comprising said ultrathin vitrified water layer.

20. The method of claim 16, wherein said physical parameter of said sample is a concentration of suspended particles of interest in said ultrathin vitrified water layer.

* * * * *